(12) United States Patent
Suzuki et al.

(10) Patent No.: US 7,245,343 B2
(45) Date of Patent: Jul. 17, 2007

(54) LIQUID CRYSTAL DISPLAY DEVICE

(75) Inventors: Masayoshi Suzuki, Tokyo (JP); Toshiya Ishii, Tokyo (JP); Seiji Suzuki, Tokyo (JP); Hiroaki Matsuyama, Tokyo (JP); Kiyomi Kawada, Tokyo (JP); Yoshihiko Hirai, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 556 days.

(21) Appl. No.: 10/014,509

(22) Filed: Dec. 14, 2001

(65) Prior Publication Data

US 2002/0080320 A1    Jun. 27, 2002

(30) Foreign Application Priority Data

Dec. 15, 2000    (JP) .............................. 2000-382684

(51) Int. Cl.
*G02P 1/1339* (2006.01)
(52) U.S. Cl. .................. 349/153; 349/43; 349/155; 349/156
(58) Field of Classification Search .................. 349/42, 349/43, 143, 141, 38
See application file for complete search history.

(56) References Cited

U.S. PATENT DOCUMENTS

| | | | |
|---|---|---|---|
| 538,798 | A | 5/1895 | Sewall |
| 5,229,873 | A | 7/1993 | Hirose et al. |
| 5,309,264 | A | 5/1994 | Lien et al. |
| 5,495,352 | A * | 2/1996 | Shinjo et al. .................. 359/54 |
| 5,877,512 | A * | 3/1999 | Kim ............................. 257/57 |
| 5,963,290 | A | 10/1999 | Murai et al. |
| 6,344,883 | B2 * | 2/2002 | Yamada et al. ................ 349/32 |
| 6,407,791 | B1 * | 6/2002 | Suzuki et al. ................ 349/129 |
| 6,433,764 | B1 * | 8/2002 | Hebiguchi et al. ............ 345/87 |
| 6,441,878 | B1 * | 8/2002 | Wong .......................... 349/143 |
| 6,466,291 | B1 * | 10/2002 | Ham ............................ 349/141 |
| 6,466,295 | B1 * | 10/2002 | Hsieh .......................... 349/155 |

(Continued)

FOREIGN PATENT DOCUMENTS

JP    02-013927    1/1990

(Continued)

OTHER PUBLICATIONS

Masayoshi Suzuki et al., "Characterization of a Homeotropic 4-Domain Liquid Crystal Cell Which Uses Oblique Electric Field", Mol. Cryst. and Liq. Cryst., 2001, vol. 367, pp. 809-817.

(Continued)

*Primary Examiner*—Evan Pert
*Assistant Examiner*—Fazli Erdem
(74) *Attorney, Agent, or Firm*—McGinn IP Law Group, PLLC

(57) ABSTRACT

To provide a liquid crystal device a liquid crystal display having a high contrast over wide viewing angles while reducing the color distortion.

A liquid crystal display device comprises a first substrate on which a plurality of pixel electrodes are formed, a second substrate on which an opposing electrode is formed, and a liquid crystal layer sandwiched between the first and second substrates, the second substrate further having thereon a plurality of protrusions, each of the protrusions being positioned at a substantially central portion of a corresponding one of the pixel electrodes.

19 Claims, 19 Drawing Sheets

U.S. PATENT DOCUMENTS

| | | | |
|---|---|---|---|
| 6,476,898 B2 * | 11/2002 | Song et al. | 349/139 |
| 6,504,592 B1 * | 1/2003 | Takatori et al. | 349/129 |
| 6,512,568 B2 * | 1/2003 | Song et al. | 349/143 |
| 6,535,265 B2 * | 3/2003 | Choi et al. | 349/156 |
| 6,573,964 B1 * | 6/2003 | Takizawa et al. | 349/129 |
| 6,583,837 B1 * | 6/2003 | Fukumoto et al. | 349/129 |

FOREIGN PATENT DOCUMENTS

| | | |
|---|---|---|
| JP | 02-55340 | 2/1990 |
| JP | 04-044478 | 2/1992 |
| JP | 4-261522 | 9/1992 |
| JP | 5-113561 | 5/1993 |
| JP | 5-505247 | 8/1993 |
| JP | 05-249436 | 9/1993 |
| JP | 06-43461 | 2/1994 |
| JP | 6-43461 | 2/1994 |
| JP | 06-301036 | 10/1994 |
| JP | 07-072484 | 3/1995 |
| JP | 08-15714 | 1/1996 |
| JP | 08-101399 | 4/1996 |
| JP | 08-292423 | 11/1996 |
| JP | 08-292454 | 11/1996 |
| JP | 09-211468 | 8/1997 |
| JP | 10-20323 | 1/1998 |
| JP | 10-186330 | 7/1998 |
| JP | 10-186351 | 7/1998 |
| JP | 10-333180 | 12/1998 |
| JP | 11-072793 | 3/1999 |
| JP | 2947350 | 7/1999 |
| JP | 11-264979 | 9/1999 |
| JP | 11-281950 | 10/1999 |
| JP | 2000-029010 | 1/2000 |
| JP | 2000-047217 | 2/2000 |
| JP | 2000-122080 | 4/2000 |
| JP | 2000-137227 | 5/2000 |
| JP | 2000-231098 | 8/2000 |
| JP | 2000-298282 | 10/2000 |

OTHER PUBLICATIONS

Masayoshi Suzuki et al., "Characterization of a Homeotropic 4-Domain LC Cell Which Uses Oblique Electric Field", Sendai, Japan, 18th International Liquid Crystal Conference, Jul. 2000, p. 129.

* cited by examiner

LIQUID CRYSTAL DISPLAY DEVICE

BACKGROUND OF THE INVENTION

1. Field of the Invention

The present invention relates to a liquid crystal display. More particularly, the present invention relates to a liquid crystal display that can be easily manufactured and used as a display device with good visibility.

2. Description of the Related Art

Liquid crystal display devices now have various applications such as display screens or monitors for personal computers, factory automation systems, televisions, information terminals and airport control towers. Liquid crystal display devices can also be used for light bulbs of a liquid crystal projector.

Most liquid crystal display devices in use today are of twisted nematic (TN) type, in which a nematic liquid crystal is filled between two glass substrates. When no voltage is applied, liquid crystal molecules are aligned parallel to the substrate and the display appears "white". When a voltage is applied, the liquid crystal molecules align with the resulting electric field. Regions where the electric field is applied appear "black". Therefore, it is possible to achieve many intermediate levels of gray scale by controlling the voltage and, in turn, molecular orientation vectors.

The TN liquid crystal display has, however, a relatively narrow viewing angle due to the inherent twisting behavior of the liquid crystal molecules. This problem of narrow viewing angle is particularly prominent in the direction of tilt of the liquid crystal molecules for gray-scale images.

Some techniques have been proposed to improve the visibility of the liquid crystal display devices. For example, Japanese Patent Laid-open Nos. 4-261522 (corresponding to U.S. Pat. No. 5,229,873) and 6-43461 (corresponding to U.S. Pat. No. 5,309,264) disclose the use of more than one liquid crystal domains. As shown in FIG. 1A, the liquid crystal display disclosed comprises a color filter substrate 501 and a lower substrate. The color filter substrate 501 comprises a common electrode 502 and an alignment layer 503 laminated thereon. A cutout 517 is formed in the common electrode and the alignment layer. The lower substrate comprises a pixel electrode 504 and another alignment layer 503 laminated thereon. Homeotropically aligned liquid crystal molecules 508 are placed between the substrates. The substrates-liquid crystal combination is sandwiched between two crossed polarizers of which polarization axes are perpendicular to each other. When a voltage is applied, the electric fields at the edges of the cutout (referred to as fringe fields) are tilted and each pixel is divided into two or more liquid crystal domains. The characteristics of the domains are determined by the shape of the cutout(s) of, for example, rectangular or X-shaped as shown in FIGS. 1B and 1C.

It should be noted that Japanese Patent Laid-open No. 4-261522 provides a high-contrast characteristics by means of controlling the tilt direction of the liquid crystal molecules during application of voltage. Japanese Patent Laid-open No. 6-43461 uses optical compensation films when necessary to improve the viewing angle in the black mode.

It is also disclosed in the latter that the viewing angle can be improved by using a fringe field for dividing each pixel into two or more domains even in a twisted nematic liquid crystal display rather than a homeotropic liquid crystal display.

The common electrode having the cutout is produced by using microfabrication processes such as photoresist processing, which are not required for the manufacture of typical TN liquid crystal display devices. In addition, the upper and lower substrates should be positioned precisely. This is a particularly significant problem for active matrix liquid crystal display devices having a switching element such as a TFT.

In the manufacture of typical active matrix liquid crystal display devices, switching elements such as thin film diodes are formed on one transparent substrate. This means that the microfabrication is required only for the substrate on which the switching elements are formed. It is not necessary for the other substrate (which is typically referred to as a common electrode) to be subjected to such microfabrication. Instead, the electrode is formed over the entire surface of the substrate.

However, the above-mentioned cutout makes it necessary to use the microfabrication of the common electrode, increasing the number of processes. Furthermore, it is necessary to position the upper and lower substrates presicely after the microfabrication.

Japanese Patent Laid-open No. 10-333180 describes a configuration where a thin film transistor (TFT), a gate line, and a drain line are all placed beneath a pixel electrode in order to prevent the electric fields generated around the TFT, the gate line, and the drain line from affecting the fringe field produced by the cutout(s) in the common electrode. However, the components beneath the pixel electrode reduce the aperture ratio of the liquid crystal display.

Japanese Patent Laid-open No. 10-20323 (corresponding to U.S. Pat. No. 5,963,290) discloses a TN liquid crystal display comprising two substrates sandwiching an liquid crystal layer therebetween, the liquid crystal layer having two or more small regions, wherein one substrate has an aperture in which a second electrode is provided. A voltage applied to the second electrode produces a fringe field, changing the tilt direction of the liquid crystal molecules inside each pixel to produce a multi-domain structure. This produces the increased viewing angles. It is noted that the voltage application to the second electrode involves a special driving procedure. However, this procedure cannot be omitted. The multi-domain structure can only be achieved after a voltage is applied to the second electrode.

Japanese Patent Laid-open No. 5-113561 (corresponding to European Patent No. 0 538 796) describes a homeotropic alignment type liquid crystal display that uses a compensation film having a negative birefringence to compensate the change in angle-dependent birefringence of the liquid crystal with no applied voltage and quarter wave plates having positive and negative optical activities to ensure brightness of the display. This technique produces the increased viewing angles for a black image but the orientation of the liquid crystal molecules are not defined precisely. Not all pixels have desired characteristics of the domains and the display can sometimes appears lightly harsh. The viewing angle itself is not very satisfactory.

Japanese Patent No. 2947350 discloses to provide a protrusion or a cutout on or in the upper and lower substrates in order to separate the homeotropically aligned liquid crystal molecules in response to the application of a voltage. At least one of them is the protrusion. However, this requires that the both substrates are subjected to lithographic processing and the edges of the substrates should be positioned precisely.

International Patent Publication No. WO91/10936 (JP-T-5-505247) discloses an In-Plane-Switching (IPS) liquid crystal display wherein both electrodes are mounted on the same substrate and the liquid crystal molecules can rotate in the substrate plane. When a voltage is applied across the electrodes, the liquid crystal molecules align themselves with the electric field while remaining parallel with the substrates. With this technique, no liquid crystal molecules become anchored to the substrate during the application of a voltage. The difference of the viewing direction can be reduced and it is possible to provide a liquid crystal display with very low variation of birefringence over wide viewing angles. Drawbacks of this technique are associated with a small aperture ratio and a cell gap because a smaller cell gap requires a higher driving voltage.

On the other hand, Journal of Applied Physics, Vol. 45, No. 12 (1974) 5466 and Japanese Patent Laid-open No. 10-186351 disclose a homeotropic-aligned liquid crystal with positive dielectric anisotropy combined with the IPS technique. The liquid crystal molecules are caused to be lined up in a lateral direction along the electric fields parallel with the substrates. It is noted that the homeotropic-aligned liquid crystal molecules take on different tilt angles due to the directions of the electric fields. The resulting multi-domain directional alignment contributes to providing a liquid crystal display with wide viewing angles.

In the driving methods based on the IPS technique and the electric fields parallel with the substrate for the homeotropically aligned molecules, a color filter layer is disposed between the layer on which the liquid crystal is placed and the opposite substrate. The electric fields generated by the application of potential across the source electrode and the common electrode may badly affect the color filter layer and in turn the display properties especially when the switching cell has a TFT configuration. This is because the dyes used for the color filter contain contaminants such as a sodium ion. The electric fields applied to the color filter layer results in charge buildup thereon. The charge buildup on the color filter layer leads continuous application of unnecessary electric fields to the portion of the liquid crystal beneath the region with charge, causing color distortion of the filter.

Japanese Patent Laid-open No. 10-186330 proposes to use a photo-sensitive material to form a square wall. This arrangement is used as a basic unit to produce a pixel. The liquid crystal molecules with negative dielectric anisotropy are caused to be oriented in different directions to produce two or more domains within each pixel. However, it is necessary to use the photolithography to form the suitable wall for the orientation of the liquid crystal molecules. Such photolithography increases the number of manufacturing steps.

With respect to the above, an object of the present invention is to overcome the drawbacks and problems associated with the conventional liquid crystal display devices by means of providing a liquid crystal display having a high contrast over wide viewing angles without addition of a complicated manufacturing step such as photo-resist processing and advanced edge-positioning. In particular, the present invention is directed to reduce the color distortion of the liquid crystal display.

Another object of the present invention is to provide a simple and easy method for manufacturing a liquid crystal display.

A yet another object of the present invention is to provide a method for driving a liquid crystal display with which the viewing angle-associated characteristics and properties of the display can be exploited effectively.

BRIEF SUMMARY OF THE INVENTION

In order to achieve the above mentioned objects, a first aspect of the present invention provides a liquid crystal display device comprising a first substrate on which a plurality of pixel electrodes are formed, a second substrate on which an opposing electrode is formed, and a liquid crystal layer sandwiched between the first and second substrates, the second substrate further having thereon a plurality of protrusions, each of the protrusions being positioned at a substantially central portion of a corresponding one of the pixel electrodes.

A second aspect of the present invention provides the first substrate of the liquid crystal display device has a plurality of pixels, each of the pixels being constituted by plural ones of the pixels which are interconnected with one another.

A third aspect of the present invention provides a liquid crystal display device, wherein each of protrusions penetrates through the liquid crystal layer to reach the corresponding one of the pixel electrodes.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention are described with reference to the drawings.

First Embodiment

Referring to FIGS. 2A to 7G, a liquid crystal display according to a first embodiment of the present invention is described. This liquid crystal display is based on the simple matrix driving method. A pixel thereof is shown in cross section in FIG. 2A, taken on the line A-A' in FIG. 2B.

Figure 1A:
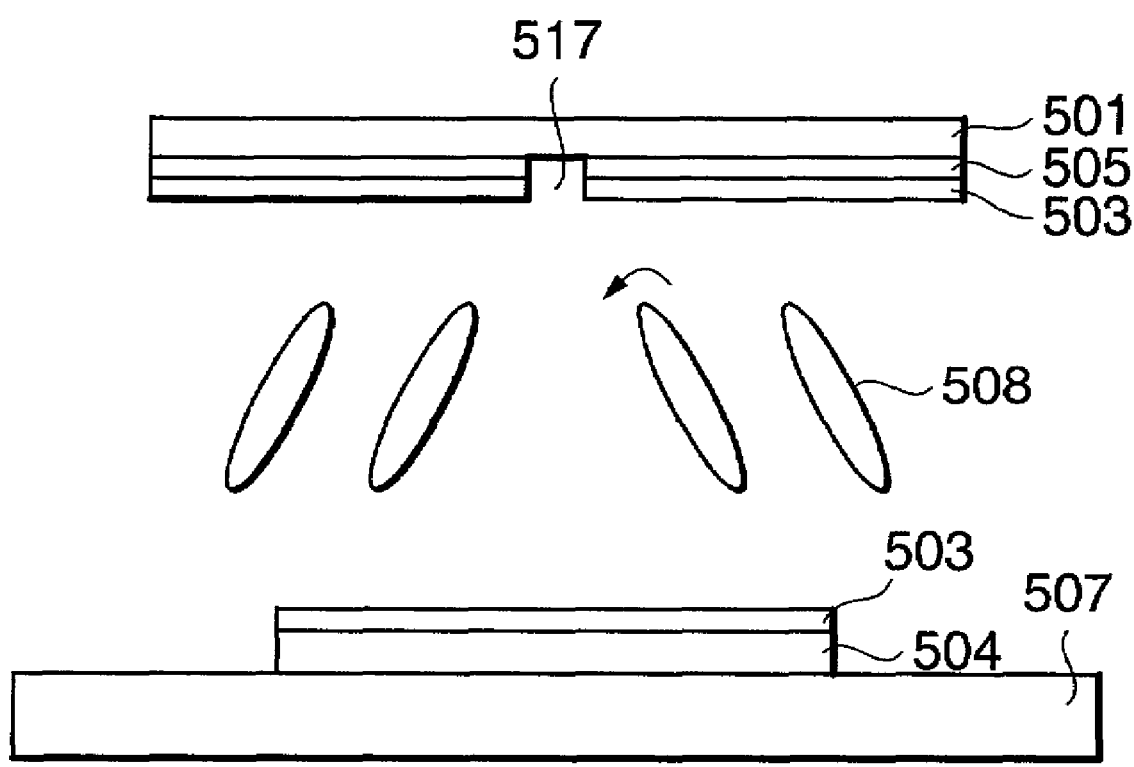
FIG. 1A is a cross sectional view of a single pixel in a conventional liquid crystal display.
Figure 1B:
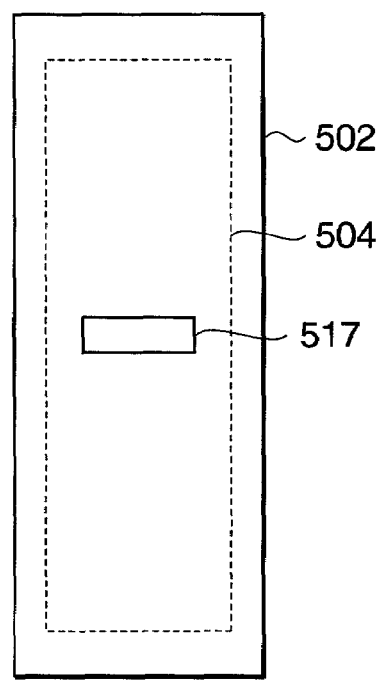
FIG. 1B is a plan view of a conventional liquid crystal display with the pixel shown in FIG. 1A.
Figure 1C:
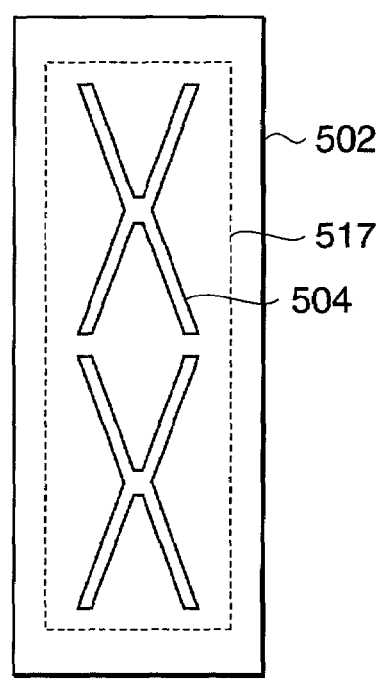
FIG. 1C is a plan view of a conventional liquid crystal display with the pixel shown in FIG. 1A.
Figure 2A:
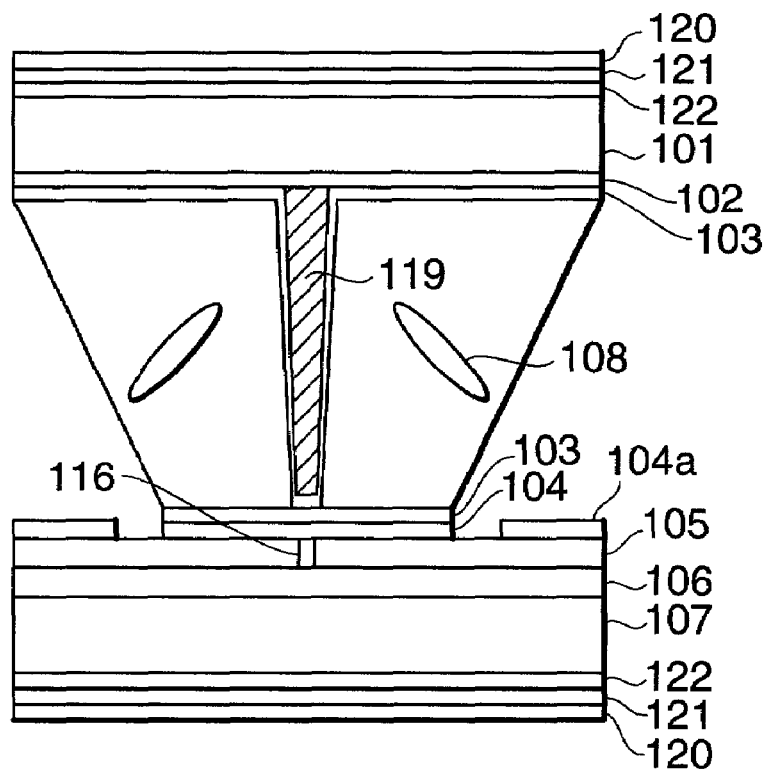
FIG. 2A is a cross sectional view of a single pixel in a liquid crystal display according to a first embodiment of the present invention, taken on the line A-A' in FIG. 2B.
Figure 2B:
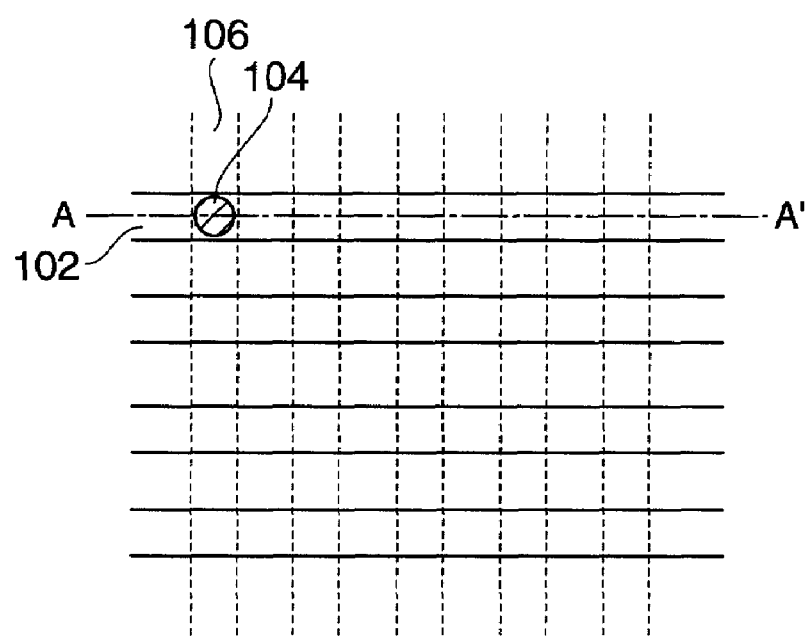
FIG. 2B is a plan view of a liquid crystal display with the pixel shown in FIG. 2A.

The liquid crystal display comprises an upper substrate and a lower substrate. The upper substrate comprises a transparent substrate 101 having transparent electrodes (common electrodes) 102 of, for example, indium tin oxide (ITO) and at least one rod-shaped spacer (hereinafter, also called as a spacer) 119 on the back thereof. A homeotropic alignment layer 103 is applied to the transparent electrode 102. The transparent substrate 101 of the upper substrate also has a uniaxial negative compensation film 122, a quarter wave plate 121, and a polarizing plate 120 formed in this order on the top surface thereof. With the simple matrix liquid crystal, the transparent electrodes 102 are arranged in a stripe pattern as shown in FIG. 2B.

A lower substrate 107 has wiring electrodes 106 formed in a stripe pattern on the top surface thereof. The wiring electrodes 106 are perpendicular to the transparent electrodes 102 on the upper substrate. An insulation film 105 made of, for example, silicon nitride is formed on the stripe pattern of the wiring electrodes 106. The wiring electrodes 106 are connected to pixel electrodes 104 via through-holes 116. The pixel electrode has a symmetrical shape. The lower substrate 107 also has the uniaxial negative compensation film 122, the quarter wave plate 121, and the polarizing plate 120 formed in this order on the back thereof.

The upper and lower substrates are joined via the spacer 119 that is placed at the approximate symmetrical center of the pixel electrode 104. Liquid crystal molecules 108 with negative dielectric anisotropy are filled between the upper and lower substrates. The rod-shaped spacer 119 is not necessarily formed on the common electrode 102. Instead, it may be formed on the upper surface of the pixel electrode 104. The only requirement is that the spacer 119 is located at or around the symmetrical center of the pixel electrode 104.

The pixel electrode 104 is smaller than the common electrode 102 and is covered with the common electrode 102. The pixel electrode 104 has a generally symmetrical shape such as a circle, an ellipsoid, or a polygon. More specifically, the pixel electrode 104 may have a shape of a circle, an ellipsoid, or a regular polygon including a regular pentagon, a regular hexagon, a regular octagon, and a square, as shown in FIGS. 2C to 2G. When the pixel electrode 104 has a polygonal shape, it is not necessarily required to be an exactly regular polygon. A certain amount of variations may be accepted.

The rod-shaped spacer 119 has a similar configuration in cross section to the pixel electrode 104 which is reduced in size. From the viewpoint of orientation, it is preferable that the spacer 119 be of a trapezoid shape in vertical cross section as shown in FIG. 2A with the side facing the common electrode 102 being wide and the side facing the pixel electrode being narrow or tapered. However, it should be noted that the configuration of the spacer 119 is of secondary importance because is has a small surface area. What is most important is there is the spacer 119 in any event.

It is desired that the spacer 119 is made of an optical isotropic material or a black material in order to avoid light leakage for light that travels through the liquid crystal display. Alternatively, the spacer 119 and the surroundings thereof may be covered with a light-shielding layer. The light-shielding layer maybe formed of a metal for a gate layer on the side of the TFT or be achieved by providing a black matrix around the rod inside the pixel on the side of the color filter.

The rod-shaped spacer 119 may be formed by using a photo-sensitive material. Examples of such materials include a photo-sensitized acrylate resins and novolak-based positive resists. Alternatively, the rod-shaped spacer 119 may be formed of an inorganic material.

The rod-shaped spacer 119 is typically formed through photolithography on the substrate on the side of the common electrode 102. However, it is preferable that the spacer 119 be formed on the substrate on the side of the pixel electrode from the edge-positioning viewpoint. What is most important is the spacer 119 is present rather than the spacer is precisely positioned. It is enough that the spacer 119 is at or around the symmetric center of the pixel electrode. Therefore, no precise edge-positioning is required even when the spacer 119 is provided on the electrode on the opposite substrate.

Figure 2C:
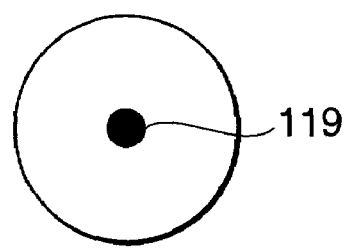
FIGS. 2C-2G are conceptual diagrams illustrating some configurations of pixel electrodes.
Figure 2D:
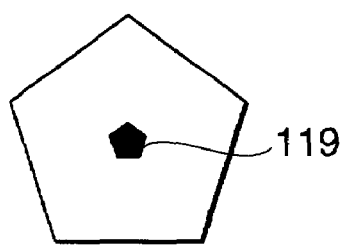
Figure 2E:
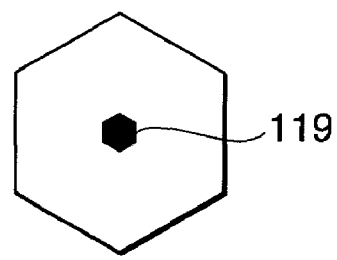
Figure 2F:
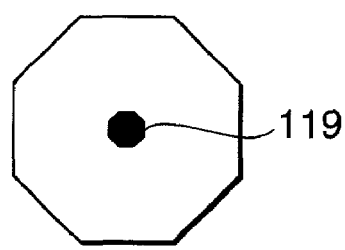
Figure 2G:
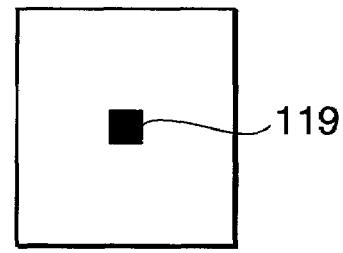
Figure 3A:
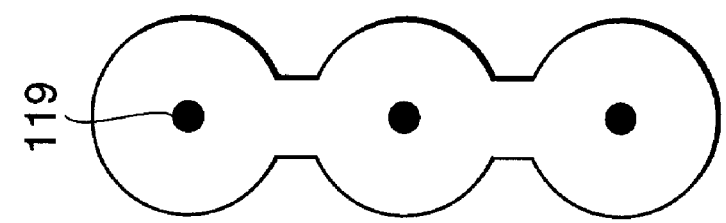
FIGS. 3A-3I are conceptual diagrams illustrating some configurations of pixel electrodes constituted by plural ones of the pixels which are interconnected with one another.
Figure 3B:
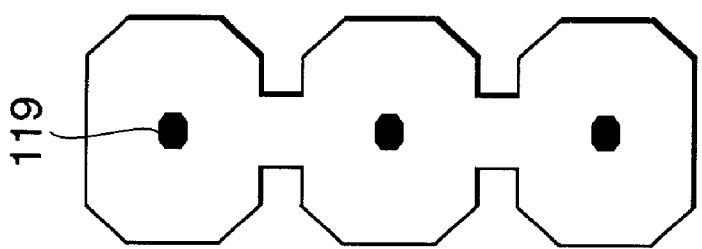
Figure 3C:
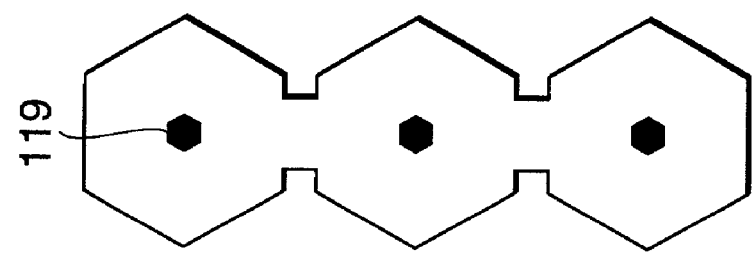
Figure 3D:
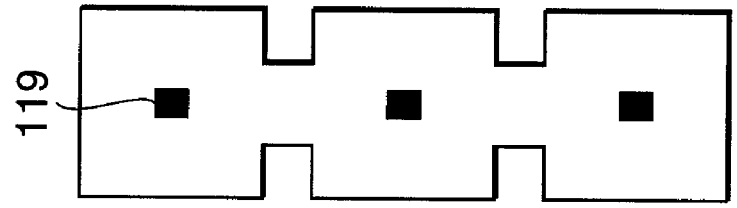
Figure 3I:
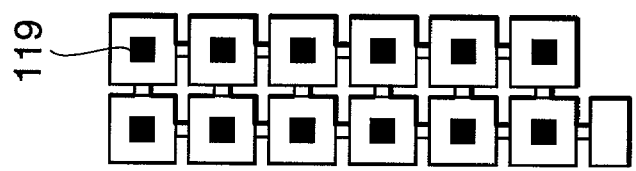
Figure 3H:
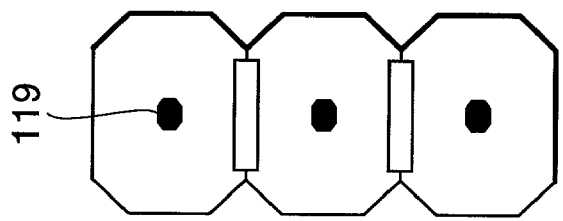
Figure 3G:
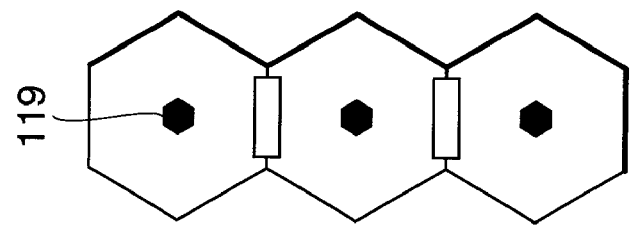
Figure 3F:
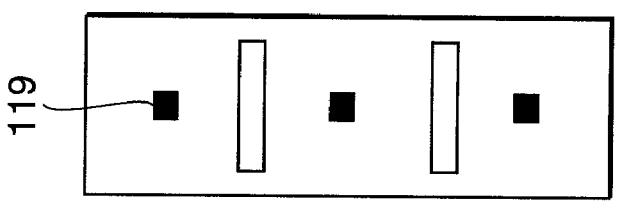
Figure 3E:
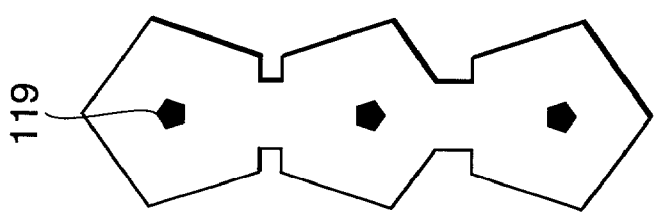
Figure 4A:
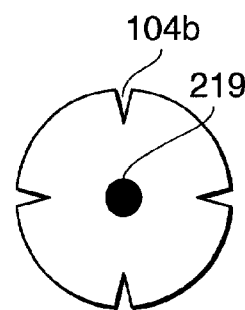
FIGS. 4A-4E are conceptual diagrams illustrating some configurations of pixel electrodes with notches formed therein.
Figure 4B:
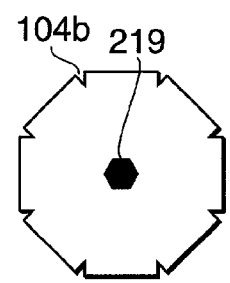
Figure 4C:
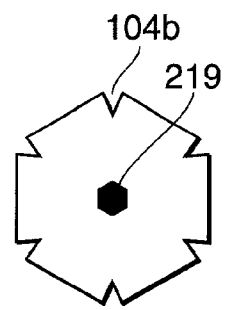
Figure 4D:
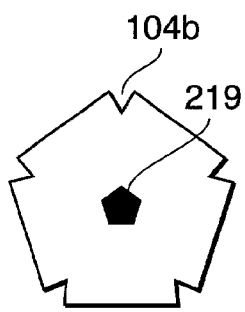
Figure 4E:
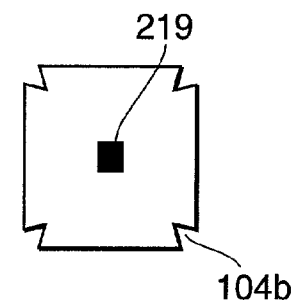
Figure 5A:
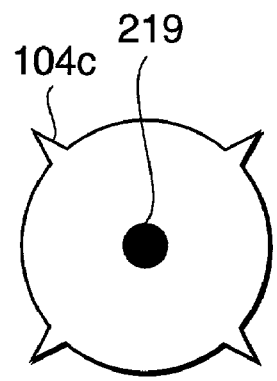
FIGS. 5A-5H are conceptual diagrams illustrating some configurations of pixel electrodes with projections formed thereon.
Figure 5B:
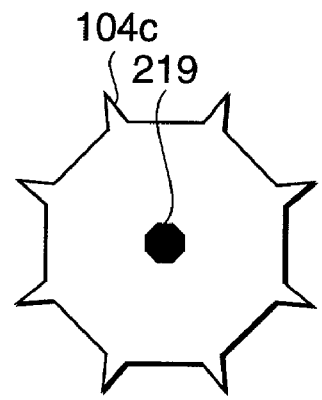
Figure 5C:
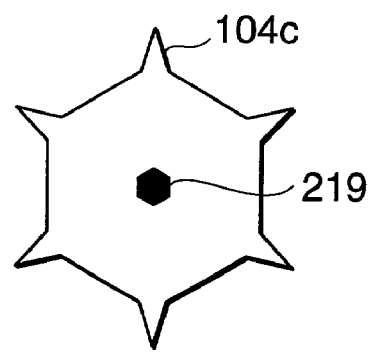
Figure 5D:
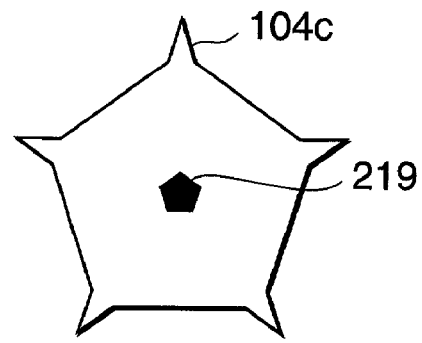
Figure 5E:
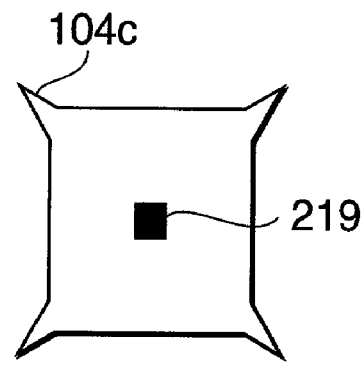
Figure 5F:
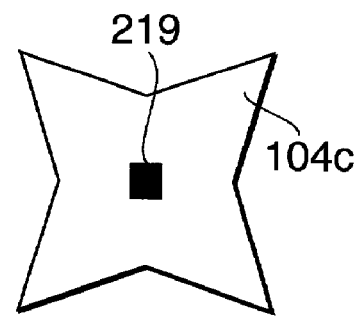
Figure 5G:
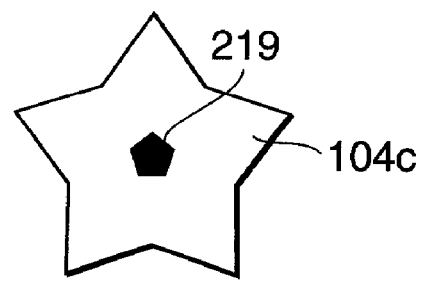
Figure 5H:
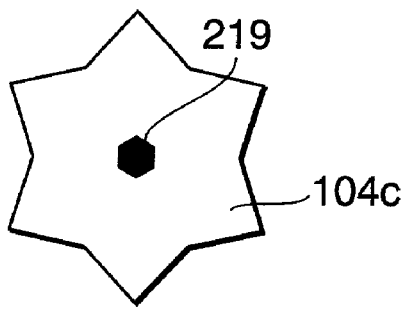
Figure 6A:
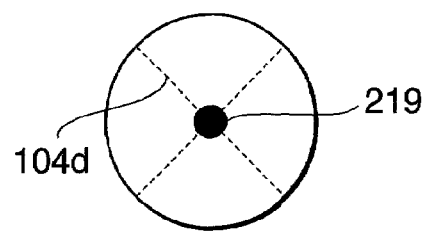
FIGS. 6A-6G are conceptual diagrams illustrating some configurations of pixel electrodes having electrode-free areas where no electrode is formed.
Figure 6B:
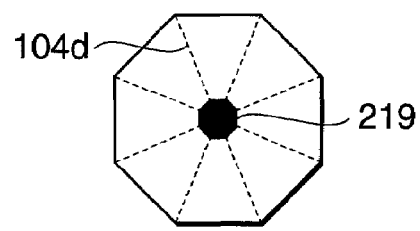
Figure 6C:
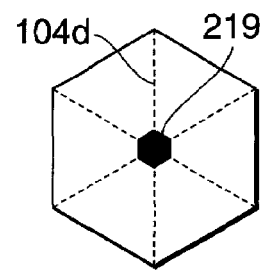
Figure 6D:
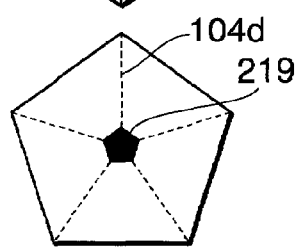
Figure 6E:
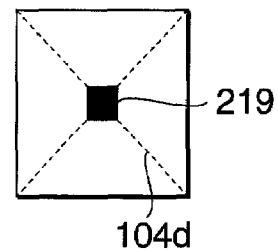
Figure 6F:
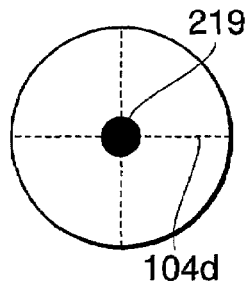
Figure 6G:
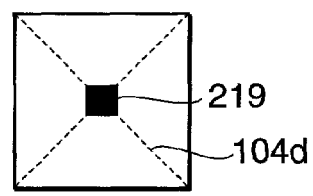
Figure 7A:
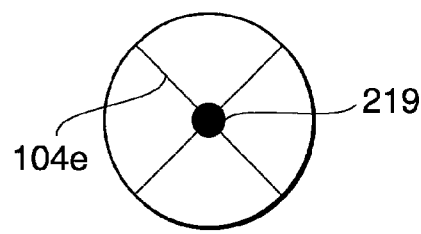
FIGS. 7A-7G are conceptual diagrams illustrating some configurations of pixel electrodes with concave portions formed therein.
Figure 7B:
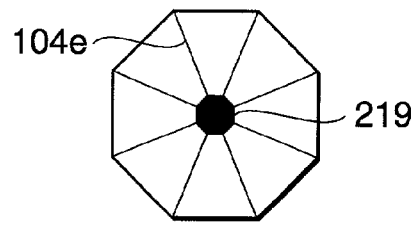
Figure 7C:
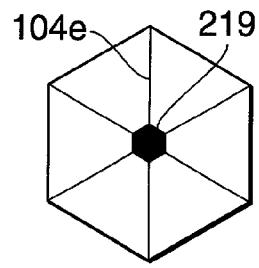
Figure 7D:
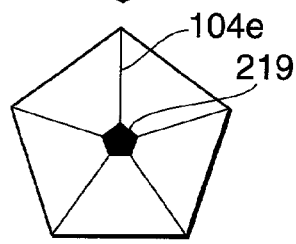
Figure 7E:
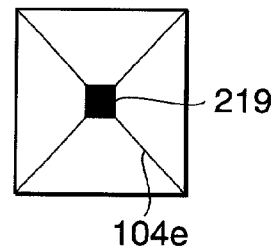
Figure 7F:
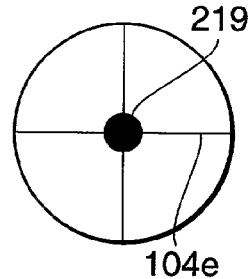
Figure 7G:
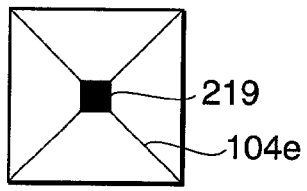

The rod-shaped spacer 119 illustrated in FIG. 2C has the similar configuration in cross section to the pixel electrode 104. More specifically, the cross section of the spacer 119 has a shape of a circle, an ellipsoid, or a regular polygon such as a regular pentagon, a regular hexagon, a regular octagon, and a square that are smaller than but similar to the shape of the corresponding pixel electrode 104. However, it is understood that the spacer 119 is not necessarily similar in sectional configuration to the pixel electrode 104.

As shown in FIG. 2A, a shielding electrode 104*a* is provided around the pixel electrode 104 in order to prevent the multi-domains of the liquid crystal molecules from being affected by the electric fields generated by the lower wiring electrodes 106.

When no voltage is applied, the liquid crystal molecules 108 are normally aligned at right angles to the substrates because the alignment layers 103 on the upper and lower substrates are of a homeotropic alignment type. When a voltage is applied between the common electrode 102 and the pixel electrode 104 on the upper and lower substrates, respectively, electric fields are generated across the pixel electrode 104 and the opposing common electrode 102. Since the pixel electrode 104 has a symmetrical shape and the common electrode 102 has larger outside dimensions than the pixel electrode 104, the direction of the electric fields between the electrodes is not at right angles to the substrate. The electric fields are tilted in a direction toward the center of the pixel as shown in FIG. 2A. The electric fields cause the liquid crystal molecules 108 with negative dielectric anisotropy to be oriented toward the center of the pixel in a symmetrical manner. As a result, multiple domains are produced while maintaining the symmetrical formation of the molecules because the pixel electrode has a symmetrical shape as shown in FIG. 2C.

As described above, the rod-shaped spacer 119 is located at the approximate symmetrical center of the pixel electrode 104. The spacer 119 plays an essential role to make up separate domains where the liquid crystal molecules 108 are aligned differently from those in the other domains. In other words, the boundaries of four distinct liquid crystal domains are defined accurately by the spacer 119 which is provided during the manufacturing operation rather than after the application of a voltage. This contributes to producing a proper multi-domain structure rapidly in response to the voltage. The spacers 119 within each pixel also serve as a support against external forces. Without such a support, the liquid crystal molecules 108 may be flown away when the outer surface of the liquid crystal display screen is depressed by, for example, a finger. The deformation of the boundaries results in harsh appearance of the display, which can be eliminated by the existence of the spacers 119. Thus, the first embodiment of the present invention provides a way of producing multiple domains in each pixel where the liquid crystal molecules are aligned differently from those in the other domains, without any special treatment of the alignment layer to increase the viewing angle.

The substrates-liquid crystal assembly (panel) may be sandwiched between the crossed polarizing plates whose transmission axes are perpendicular to each other. The resulting display operates in normally black mode, i.e., the display is black when no voltage is applied and is bright in the presence of a voltage. The viewing angle can thus be increased.

As is well known in the art, typical liquid crystal display devices comprise rectangular pixel electrodes. The configuration of the pixel electrode is, however, not specifically limited thereto. The pixel electrode may be constituted by plural ones of the pixel electrodes which are interconnected with one another as shown in FIGS. 3A to 3I. At least one rod-shaped spacer 119 is located at the approximate center of each symmetrical design. When such a continuous pattern is used in the rectangular pixel, the result is an increase in viewing angle with multiple domains whose boundaries are defined by the spacers being produced in each symmetrical portion of the pattern. As in the case described in conjunction with FIGS. 2A to 2C, the rod-shaped spacer 119 plays an essential role to make up separate domains where the liquid crystal molecules 108 are aligned differently from those in the other domains. It is advantageous that the boundaries of the liquid crystal domains are defined accurately by the spacer 119. The spacers 119 within each pixel also serve as a support against external forces. Thus, the multiple domains in each pixel become durable against the external forces and the problem of harsh appearance would be eliminated.

While the rod-shaped spacers 119 in FIG. 3A to 3I are illustrated to have a similar configuration in cross section to the corresponding pixel electrode, it is understood that the spacer and the pixel electrode may be different in configuration. The continuous pattern of the pixels is not limited to a single "chain" of symmetrical designs. The symmetrical designs may be formed in an array of n rows by m columns (wherein n an m are each a natural number). By the response considerations, the symmetrical designs (pixel units) that serve as subunits of the electrode are as small as possible. Smaller pixel units result in a higher response.

In order to ensure more precise establishment of the domain boundaries, the pixel electrode 104 may have radial notches 104*b* toward the periphery of each symmetrical geometry, as shown in FIGS. 4A to 4E. For the polygonal pixel electrodes, the notches 104*b* are formed therein at each corner of the polygon. Alternatively, as shown in FIGS. 5A to 5H, the pixel electrode 104 may have protrusions 104*c* extending radially outwardly from the periphery of the electrode. For the polygonal pixel electrodes, the protrusions 104*c* are extended from each corner of the polygon. The pixel electrode 104 may have electrode-free areas 104*d* where no electrode is formed, as indicated by the broken line in FIG. 6A to 6G. The electrode-free areas 104*d* extend radially outwardly from the center of the symmetrical electrode. Furthermore, the pixel electrode 104 may have concave portions 104*e*, as indicated by the solid line in FIGS. 7A to 7G. The concave portions 104*e* extend radially outwardly from the center of the symmetrical electrode. The concave portions 104*e* may be formed either separately on the pixel electrode or integrally therein. A combination of the above-mentioned configurations may also be used.

In FIGS. 4A to 7G, a rod-shaped spacer 219 is located at the approximate symmetrical center of each pixel electrode. As in the case of the spacer 119, the rod-shaped spacer 219 plays an essential role to make up separate domains where the liquid crystal molecules are aligned differently from those in the other domains. It is advantageous that the boundaries of the liquid crystal domains are defined accurately by the spacer 219. The spacers 219 within each pixel also serve as a support against external forces. Thus, the multiple domains in each pixel become durable against the external forces, preventing the undesirable flow of the liquid crystal molecules. The problem of harsh appearance associated with such deformation would be eliminated.

When there is an organic insulating layer is provided between a TFT and the pixel electrode or when the pixel electrode is placed between the color filter layer and the liquid crystal layer, the concave portion 104*e* maybe formed in the interlayer insulation film or an overcoat layer. This makes it possible to provide a deep concave portion 104*e* without adding complexity of the manufacturing process and in turn to ensure stable establishment of the domain boundaries.

For the homeotropic alignment, the liquid crystal molecules are rearranged to form a twisted or helical path when a voltage is applied. A chiral agent may be added to stabilize this orientation and increase the response speed. Alternatively, or in addition, the notches or the concave portion in the pixel may be formed in a helical shape within each pixel.

The notch 104b, the protrusion 104c, the electrode-free area 104d, and a concave portion 104e described above extend radially outwardly. In some cases, however, it is preferable that they be provided in parallel with the sides when the liquid crystal with positive dielectric anisotropy have homogenous alignment where the long axis of each liquid crystal molecule is parallel or anti-parallel to substrate plane.

The liquid crystal display according to the present invention may comprise at least one optical compensation plate between the polarizing plate and the liquid crystal cells in order to increase the viewing angle. Since because the liquid crystal molecules are in a homeotropic orientation when no voltage is applied, it is preferable that the compensation plate have a negative birefringence in order to control optical retardation when the liquid crystal display is viewed at an oblique angle. The compensation plate may be a single film formed by such a method as biaxial orientation. Alternatively, two or more uniaxially oriented films may be laminated to form a substantially optically negative, uniaxial compensation plate.

The compensation plate serves to compensate a phase retardation of the liquid crystal when no voltage is applied. The black on the display is very black even if the viewer moves several inches away from directly in front of either of the screen. The visibility of the display is thus improved.

For some cells, a transition region may be generated in the different domains after a voltage is applied. This transition region appears black under a perpendicular polarizing plate, causing reduction of brightness. The transition region may move slowly to such an extent that an apparent response speed is reduced.

When the above-mentioned uniaxially oriented film is a quarter wave plate, it is possible to increase the apparent response speed by means of making the boundaries invisible. More specifically, the quarter wave plates are disposed on both sides of the liquid crystal cell such that the optical axis of the quarter wave plate is set at 45 degrees with respect to the absorption axis of the perpendicular polarizing plate. This reduces the birefringence of the quarter wave plate. Another uniaxially oriented film may be overlapped therewith to provide a substantially uniaxial negative compensation plate.

The additional uniaxially oriented film is preferably a half wave plate obtained by converting the linear polarization of the quarter wave plate into circular polarization, which ensures bright display screen regardless of the orientation of the liquid crystal molecules. The brightness feature may be exploited sufficiently. In this event, one of the two quarter wave plates disposed outside the substrates may be a compensation plate having a negative birefringence. The upper and lower quarter wave plates compensate their respective birefringence at a significantly wide viewing angle. In particular, it is advantageous that a uniaxial compensation plate is combined therewith whose optical axis is at right angle to the substrate. More specifically, when the uniaxial negative compensation film 122 is disposed between the polarizing plate 120 and the transparent substrate 101 such that the optical axis of the compensation film 122 is crossed at right angle to the substrate. This configuration provides the widest viewing angle in principle. As a result, birefringence of the liquid crystal becomes less angle dependence in the black mode. The black becomes very black with a wider viewing angle. It is noted that the birefringent film may be simulated with a biaxially oriented film to provide similar effects.

The liquid crystal molecules tilted at 45 degrees with respect to the transmission axis of the polarizing plate 120 provides the highest luminance. Most of the stabilized liquid crystal molecules 108 are those tilted in the top-to-bottom and side-to-side directions in the pixel. Therefore, the polarizing plate 120 is typically disposed such that the transmission axis t hereof lies at 45 degrees with respect to the pixel. However, the best visibility can be achieved along the direction of the transmission axis of the polarizing plate 120. Depending on specific applications of the liquid crystal display, it may be required to improve the visibility in other direction(s).

Since the quarter wave plate is disposed between the polarizing plate 120 and the transparent substrate 101 in this embodiment, the incident light to the liquid crystal molecules 108 is converted from linear polarization into circular polarization. Thus, high luminance can be achieved regardless of the direction of the liquid crystal molecules. This means that the transmission axis of the polarizing plate may be oriented in any desired direction. It is noted that the slow axes and the transmission axes of the upper and lower quarter wave plates make an angle of 45 degrees with each other, such that the light beams are circularly polarized at the upper and lower quarter wave plate in opposite directions in the normally black mode and in same directions in the normally white mode.

As apparent from the above, the quarter wave plate provides the circular polarization of the incident light to the liquid crystal. Therefore, the absorption axis of the polarizing plate may be determined at any angle of direction without expense of the brightness. Typically, the absorption axis lies along the top-to-bottom direction because it is usually desired to have a good viewing angle in such a direction.

In principle, the liquid crystal molecules are aligned at right angles to the substrate when no voltage is applied. However, the alignment may be disturbed depending on, for example, characteristics of the cells. Under such circumstances, an additional film with positive dielectric anisotropy may be provided to compensate the disturbance.

The above-mentioned description has been made in conjunction with a transmissive type liquid crystal display. However, the same applies to a reflective type display by means of using a metal with high reflectance such as aluminum as a material of the pixel electrode. It is possible to provide good white appearance by means of forming irregularities on the surface of the pixel electrode or using a diffuser plate.

In the method for manufacturing the liquid crystal display according to the present invention, a voltage is applied between the common electrode and the pixel electrode to control the initial orientation of the liquid crystal molecules, and then a polymerizable monomer or oligomer contained in a small amount in the liquid crystal is polymerized to ensure the initial orientation. This may be achieved in various ways. For example, heat may be applied to the liquid crystal to cause a phase transition from its liquid crystal form to an isotropic liquid and then the temperature is lowered while applying a voltage between the common electrode and the pixel electrode. Alternatively, application of a voltage between the common electrode and the pixel electrode may work well even at a room temperature. In the latter case, reaction maybe caused either before or after the application of the voltage. This method produces multiple domains using a standard driving technique. Therefore, an additional step of applying a voltage to a second electrode is not required that is disclosed in the above-mentioned Japanese Patent Laid-open No. 10-20323.

The method for manufacturing the liquid crystal display according to the present invention may be combined with an optical alignment technique to control a pre-tilt angle depending on the characteristics of the domains, thereby ensuring better control of the initial orientation. The combined effects of the pre-tilt angle and the fringe field produce multi-domain structures more effectively.

For example, the pre-tilt angle suitable for a specific multi-domain structure is achieved by using a certain substance for an alignment layer and directing polarized light at a tilt angle. Examples of the substance suitable for this purpose include those having a functional group capable of controlling the orientation of the liquid crystal with polarized light, such as a cinnamic acid group, and polymers having a photo-sensitive group to be polymerized when it is subjected to polarized light, as disclosed in AM-LCD '96/IDW' Digest of Technical Papers, page 337.

With the optical alignment technique, the number of sides of the pixel polygon affect the number of the operational steps. It is preferable that the polygon used be a square, pentagon, hexagon, heptagon, or hexagon.

The multi-domain technique itself is well known in the art. However, the domains can be retained more positively during the driving operation by means of polymerizing the polymerizable monomer or oligomer contained in a small amount in the liquid crystal.

The monomer or oligomer used in the present invention may be a photo-curable monomers, thermosetting monomers, or oligomers of these monomers. Other components may be contained as well.

The term "photo-curable monomer or oligomer" as used herein includes ultraviolet-curable monomers and oligomers curable by ultraviolet light as well photo-curable monomers and oligomers curable by visible light. The latter is preferable because of easier handling.

A polymer compound used in the present invention may have a similar structure to a liquid crystal molecule containing a liquid crystalline monomer or oligomer. However, the compound may be a flexible one containing an alkylene chain because when it is not used to orient the liquid crystal molecules. The monomer and oligomer may be either monofunctional or polyfunctional.

Examples of the photo- and ultraviolet-curable monomers used in the present invention include monofunctional acrylate compounds such as 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-ethylaminoethyl acrylate, N,N-dimethylaminoethyl acrylate, dicyclopentanyl acrylate, dicyclopentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate, and 2,2,3,4,4,4-hexafluorobutyl acrylate.

Examples also include monofunctional methyacrylate compounds such as 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3-tetrafluoropropyl methacrylate, 2,2,3,4,4,4-hexafluorobutyl methacrylate.

Other examples include polyfunctional acrylate compounds such as 4,4'-biphenyl diacrylate, diethylstilboestrol diacrylate, 1,4-bisacryloyloxybenzene, 4,4'-bisacryloyloxydiphenylether, 4,4'-bisacryloyloxydiphenylmethane, 3,9-bis[1,1-dimethyl-2-acryloyloxyethyl]-2,4,8,10-tetrasp iro[5,5]undecane, α,α'-bis[4-acryloyloxyphenyl]-1,4-diisopropylbenzene, 1,4-bisacryloyloxytetrafluorobenzene, 4,4'-bisacryloyloxyoctafluorobiphenyl, diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritol monohydroxypentaacrylate, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol-1,5-diacrylate, 1,1,2,2,3,3-hexafluoropropyl-1,3-diacrylate, and urethane acrylate oligomers.

Furthermore, polyfunctional methacrylate compounds may also be used such as, but not limited to, diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate, 2,2,3,3,4,4-hexafluoropentanediol-1,5-dimethacrylate, and urethane methacrylate oligomers; styrene; aminostyrene; and vinyl acetate.

The driving voltage for the cell according to the present invention is affected by the interface interaction between the polymer and liquid crystal materials. Accordingly, polymer compounds containing a fluorine atom may be used. Examples of such polymer compounds include polymer compounds synthesized from a mixture of, but not limited to, 2,2,3,3,4,4-hexafluoropentanediol-1,5-diacrylate, 1,1,2,2,3,3-hexafluoropropyl-1,3-diacrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2,2,2-trifluoroethyl methacrylate, 2,2,3,3-tetrafluoropropyl methacrylate, 2,2,3,4,4,4-hexafluorobutyl methacrylate, or urethane acrylate oligomers.

When a photo- or ultraviolet-curable monomer is used as the polymer compound in the present invention, photo-initiators may be used. The photo-initiator may be selected from a variety of initiators including acetophenones such as 2,2-diethoxyacetophenone, 2-hydroxy-2-methyl-1-phenyl-1-one, 1-(4-isopropylphenyl)-2-hydroxy-2-methylpropan-1-one, and 1-(4-dodecylphenyl)-2-hydroxy-2-methylpropan-1-one; benzoins such as benzoin methyl ether, benzoin ethyl ether, and benzyl dimethyl ketal; benzophenones such as benzophenone, benzoylbenzoic acid, 4-phenylbenzophenone, and 3,3-dimethyl-4-methoxybenzophenone; thioxanthones such as thioxanthone, 2-chlorothioxanthone, and 2-methylthioxanthone; diazonium salts; sulfonium salts; iodonium salts; and selenium salts.

Some examples of the first embodiments of the present invention are described below.

EXAMPLE 1

Indium tin oxide (ITO) was sputtered on glass substrates 101 and 107. An array of ITO electrodes 102 and 106 was formed through conventional photolithographic technique. A silicon nitride film 105 was deposited only on a lower substrate 107. A through-hole 116 was formed in the silicon nitride film 105 through photolithography. ITO was sputtered thereon and a hexagonal pixel electrode 104 was formed through photolithography. A generally hexagonal rod-shaped spacer whose sides are 5 micrometers long was formed on a common electrode 102 with photosensitive polysilazane such that the spacer is located at the approximate center of the pixel electrode 104 with a height of 3.5 micrometers. Homeotropic alignment layers (available under the trade designation "SE 1211" from Nissan Chemical Industries, Ltd.) 103 and 115 were applied to the upper and lower substrates. The substrates were heated for 1 hour at 200° C. to dry the coatings.

A sealant was applied along the periphery of the substrates and spacer agent was distributed. The upper and lower substrates were assembled together with the sealant with the electrodes of the matrix forming X and Y electrodes. The panel was then heated to cure the sealant.

Subsequently, nematic liquid crystal 100 with negative dielectric anisotropy was injected between the substrates. An injection hole was sealed with a photo-curable resin. Additional nematic liquid crystal with negative dielectric anisotropy was injected that had a refractive index anisotropy ($\Delta n$) of 0.096. An injection hole was sealed with a photo-curable resin.

The panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. There was no dark area along the transmission axis of the polarizing plate, providing a display with high luminance.

EXAMPLE 2

Example 1 was repeated to form a liquid crystal display except that shielding electrodes 104a were formed around each hexagonal pixel electrodes 104 on the silicon nitride film 105 over the lower substrate 107. The shielding electrodes 104a were prepared only with some changes of a mask. The resulting shielding electrodes 104a were connected to zero volts.

The optical properties of the panel thus obtained were measured. The results indicated that the panel has a high contrast ratio and high luminance over a wide viewing angle with less or no gray scale inversion. The pixels were observed under an optical microscope and no abnormal disclination was visible within the pixel that was observed in the case of Example 1.

Second Embodiment

Figure 8A:
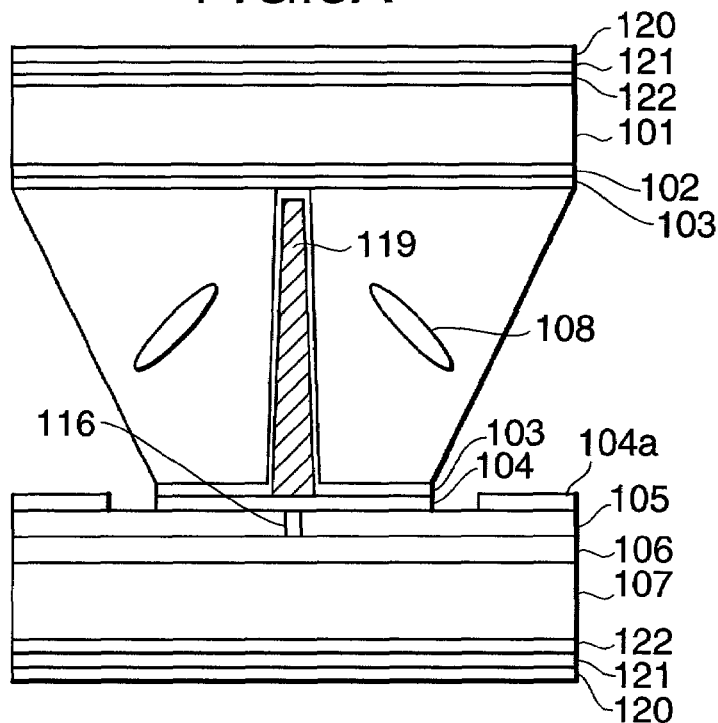
FIG. 8A is a cross-sectional view of a single pixel in a liquid crystal display according to a second embodiment of the present invention.
Figure 8B:
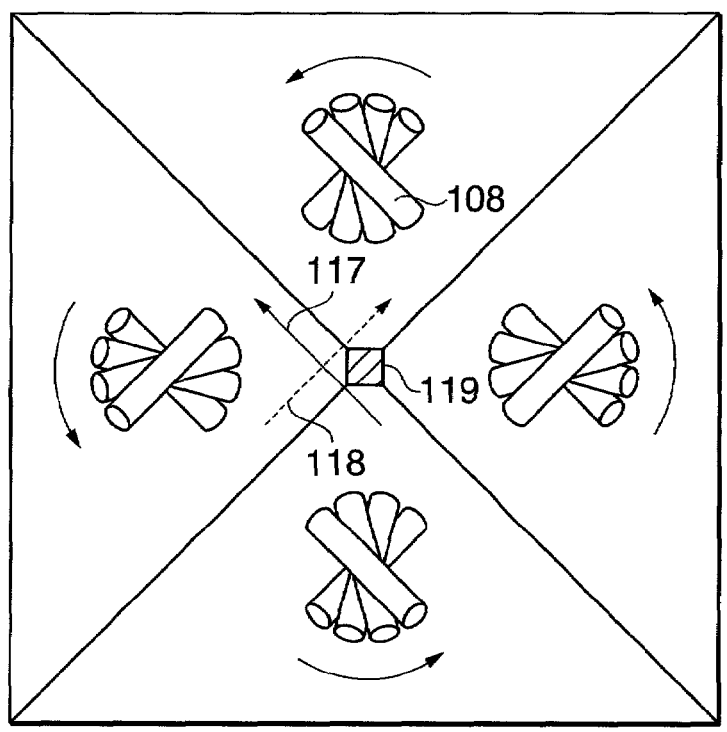
FIG. 8B is a plan view of the pixel shown in FIG. 8A being divided into four domains of liquid crystal molecules.

Referring to FIGS. 8A and 8B, a liquid crystal display according to a second embodiment of the present invention is described. This liquid crystal display is based on the simple matrix driving method and uses twisted nematic liquid crystal with positive dielectric anisotropy. A pixel thereof is shown in cross section in FIG. 8A, taken on the line A-A' in FIG. 8B.

The liquid crystal display comprises an upper substrate and a lower substrate. The upper substrate comprises a glass substrate 101 having transparent electrodes (common electrodes) 102 of, for example, indium tin oxide (ITO). An alignment layer 103 is applied to the transparent electrode 102. Rubbing of the alignment layer 103 causes the liquid crystal molecules to be aligned at right angles to the rubbing direction. The pretilt angle is very small (smaller than 1°) or even almost 0°. With the simple matrix liquid crystal, the transparent electrodes 102 are arranged in a stripe pattern. The lower substrate 107 has transparent electrodes 106 formed in a stripe pattern on the top surface thereof. The transparent electrodes 106 are perpendicular to the transparent electrodes 102 on the upper substrate. An insulation film 105 of, for example, silicon nitride is formed on the stripe pattern of the electrodes 106. The wiring electrodes 106 are connected to pixel electrodes 104 via through-holes 116. The pixel electrode has a symmetrical shape. A rod-shaped spacer 119 is formed at the approximate symmetrical center of the pixel electrode. An alignment layer 103 is applied to the upper and lower substrates. The upper and lower substrates are assembled together with the sealant. Liquid crystal molecules 108 with positive dielectric anisotropy are then injected between the substrates.

The pixel electrode 104 is smaller than the common electrode 102 and is thus covered with the common electrode 102. A shielding electrode 104a is provided around the pixel electrode 104 in order to prevent the multi-domains of the liquid crystal molecules from being affected by the electric fields generated by the lower transparent electrodes 106.

In this embodiment, the alignment layers 103 on the upper and lower substrates are subjected to rubbing or optical alignment to define the orientation of the liquid crystal molecules. The orientation of the liquid crystal molecules near the substrate 101 is indicated by a solid arrow 117 while that of the liquid crystal molecules near the lower substrate 110 is indicated by a broken arrow 118 in FIG. 8B. Such alignment can be obtained easily by using an alignment layer with stripes perpendicular to the rubbing direction or by directing polarized light to the optical alignment layer from the normal of the substrate. No chiral agent is used.

The twisted nematic liquid crystal with positive dielectric anisotropy can provides two or more possible combinations of anchoring direction and twisting direction. This allows production of multiple domains within each pixel.

With the twisted nematic structure, the liquid crystal molecules are caused to be tilted evenly in all directions. It is preferable that he pretilt angle should be as small as possible. The pretilt angle is preferably 1° or smaller, or even 0°.

The liquid crystal molecules 108 are aligned at right angles to the rubbing direction of the alignment layers 103 on the upper and lower substrates when no voltage is applied. The pretilt angle is very small (smaller than 1°) or even almost 0°. When a voltage is applied between the common electrode 102 and the pixel electrode 104 on the upper and lower substrates, respectively, electric fields are generated across the pixel electrode 104 and the opposing common electrode 102. Since the pixel electrode 104 has a symmetrical shape and the common electrode 102 has larger outside dimensions than the pixel electrode 104, the direction of the electric fields between the electrodes is not at right angles to the substrate. The electric fields are tilted in a direction toward the center of the pixel as shown in FIG. 8A. In other words, the configuration of the upper and lower electrodes determines the symmetrical shape of the fringe field.

Similar to the first embodiment, the spacer 119 is located at the approximate symmetrical center of the pixel electrode. The spacer plays an essential role to make up separate domains where the liquid crystal molecules are aligned differently from those in the other domains. The boundaries of the distinct liquid crystal domains are defined accurately by the spacer.

Normally, both the right and left twists may be formed in the domains. The fringe field causes the liquid crystal molecules to be tilted dominantly in one direction in each domain as shown in FIG. 8B. Therefore, the orientation as shown in FIG. 8B is automatically obtained. More specifically, the symmetrical multi-domain structure is produced automatically because (1) the pixel electrode 104 on the lower substrate has a symmetrical shape; (2) the common electrode 102 on the upper substrate covers the pixel electrode 104; and (3) the common electrode 102 is larger than the pixel electrode 104, producing increased viewing angle. The panel may be sandwiched between the polarizing plates whose transmission axes are perpendicular to each other, with the alignment direction of the liquid crystal being matched with the transmission axes of the polarizing plate. A resulting liquid crystal display appears white when no voltage is applied and appears black when a voltage is applied. Such a black-and-white display provides a wide viewing angle. Since each pixel is divided into multiple domains, the orientation of the liquid crystal molecules compensate that of others when the display is in black or gray scale mode. No leakage of light occurs at the boundaries of the domains where the molecules tilted at different angles are present. Accordingly, a high contrast ratio can be achieved without any light-shielding layer.

Unlike the first embodiment, no uniaxial negative compensation film is required. However, as described above, the quarter wave plate can produce an advantage from the viewpoint of the choice of process conditions because of the brightness not affected by the orientation of the liquid crystal. In this event, the surfaces of the rod-shaped spacer 119 located at the approximate symmetrical center of the pixel each make up a separate domain. The boundaries of the distinct liquid crystal domains are defined accurately by the spacer.

In order to ensure more precise establishment of the domain boundaries, the pixel electrode 104 may have radial notches 104*b* toward the periphery of each symmetrical geometry, as shown in FIGS. 4A to 4E. For the polygonal pixel electrodes, the notches 104*b* are formed therein at each corner of the polygon. Alternatively, as shown in FIGS. 4A to 4E, the pixel electrode 104 may have protrusions 104*c* extending radially outwardly from the periphery of the electrode. For the polygonal pixel electrodes, the protrusions 104*c* are extended from each corner of the polygon. The pixel electrode 104 may have electrode-free areas 104*d* where no electrode is formed, as indicated by the broken line in FIGS. 6A to 6G. The electrode-free areas 104*d* extend radially outwardly from the center of the symmetrical electrode. Furthermore, the pixel electrode 104 may have concave portions 104*e*, as indicated by the solid line in FIGS. 7A to 7G. The concave portions 104*e* extend radially outwardly from the center of the symmetrical electrode. The concave portions 104*e* may be formed either separately on the pixel electrode or integrally therein. A combination of the above-mentioned configurations may also be used.

The use of the optical alignment to ensure the multi-domain structure makes no sense for the twisted nematic liquid crystal. On the other hand, as in the liquid crystal with the negative dielectric anisotropy, the multi-domain structure can be ensured during the driving operation in the twisted nematic liquid crystal when the polymerizable monomer or oligomer contained in the liquid crystal is polymerized.

In this case, the compensation film is hardly required because the liquid crystal molecules compensate their optical properties with each other. However, it is possible to use a set of quarter wave plates disposed inside the upper and lower polarizing plates to facilitate the process of controlling the alignment of the molecules at the interface of the rubbing or optical alignment operations.

More specifically, with the quarter wave plates, a slight offset of the liquid crystal molecules does not affect the brightness of the resulting display. In particular, the birefringence of the compensation films may be compensated for by using the positive and negative quarter wave plates on the upper and lower substrates. The result is an increase in viewing angle.

Figure 9A:
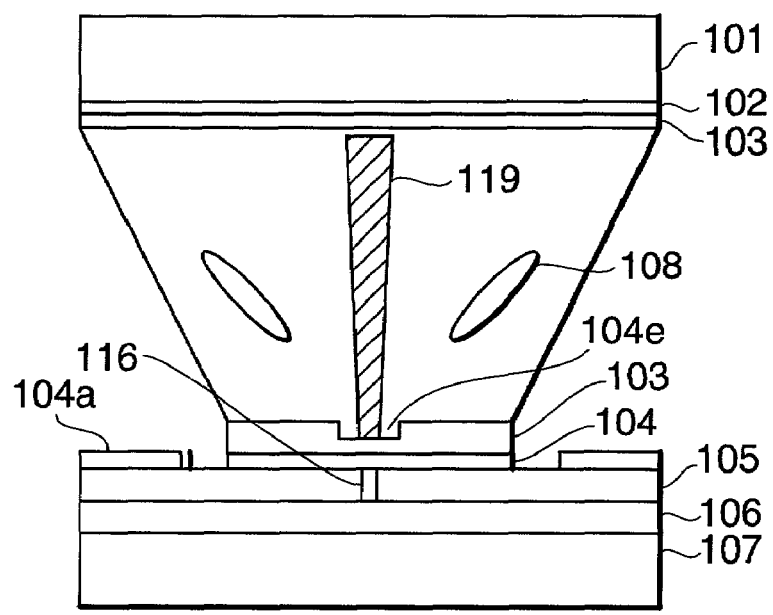
FIG. 9A is a cross-sectional view of a liquid crystal display in which a liquid crystal layer has a homogenous configuration when no voltage is applied.

FIG. 9A shows an example where the liquid crystal molecules 108 have positive dielectric anisotropy and is homogenous when no voltage is applied. The upper and lower substrates should be subjected to rubbing or optical alignment processing to define the orientation of the liquid crystal. The orientation of the liquid crystal molecules near the substrate 101 is indicated by a solid arrow 117 while that of the liquid crystal molecules near the lower substrate 110 is indicated by a broken arrow 118 in FIG. 9B. As the embodiment described above, it is preferable that he pretilt angle should be as small as possible. The pretilt angle is preferably 1° or smaller, or even 0°. Such alignment can be obtained easily by using an alignment layer with stripes perpendicular to the rubbing direction or by directing polarized light to the optical alignment layer from the normal of the substrate. No chiral agent is used.

Figure 9B:
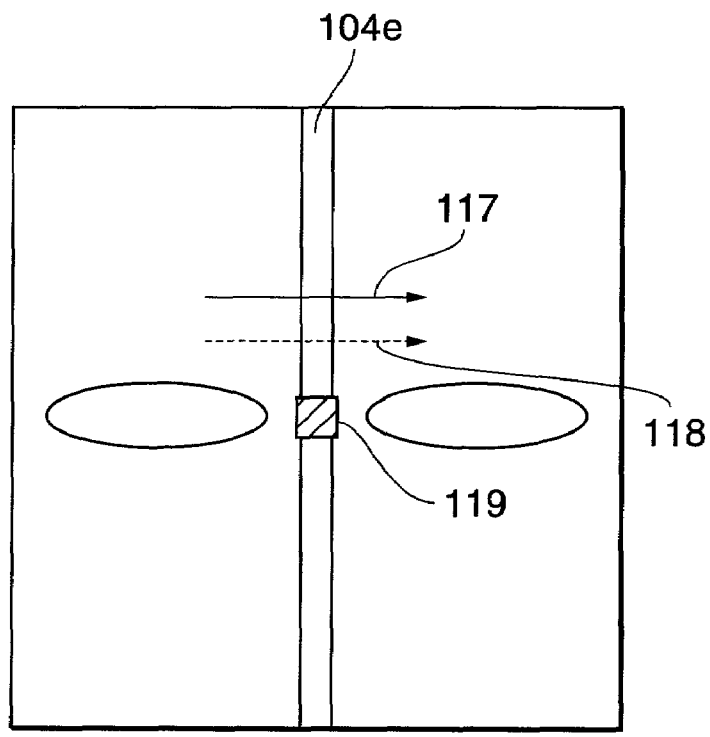
FIG. 9B is a view of a pixel divided into two domains of liquid crystal molecules in the display shown in FIG. 9A.

When a voltage is applied between the upper and lower electrodes, the fringe field is generated symmetrically. This produces two domains in each pixel with the liquid crystal molecules tilting in opposite directions in these two domains. For the homogenous alignment, it is preferable that a concave portion 104*e* be provided at the center of the pixel in order to stabilize the boundaries of the domains Other configurations and features of the liquid crystal display shown in FIGS. 9A and 9B are similar to those described in conjunction with FIGS. 8A and 8B. Similar components and parts are designated by like reference numerals and description of them will thus be omitted.

When the liquid crystal with positive dielectric anisotropy is homogenously aligned in the off state, the cell is divided into two domains with the liquid crystal molecules tilting in opposite directions rather than four domains. A uniaxial negative compensation film is disposed with the optical axis thereof being matched with that of the liquid crystal in the off state (normally black) or the uniaxial negative compensation film is disposed such that the optical axis thereof is tilted along the axis of the liquid crystal molecule in either one of the domains (normally white).

The phase retardation between the liquid crystals in at least one domain and the compensation film is compensated in the voltage-off state for the normally black mode and in the voltage-on state for the normally white mode at wide viewing angles. In such a case, the notches in FIGS. 4A to 4E, the electrode-free area in FIGS. 6A to 6G, or the concave portion in FIGS. 7A to 7G is preferably formed in parallel with the sides of the pixel electrode on the lower substrate. It is also preferable that the initial orientation of the liquid crystal be controlled to be perpendicular to them. The pretilt angle should be as close as zero, as in the case described above. For this purpose, the compensation film is almost unnecessary because the liquid crystal molecules compensate their optical properties with each other. However, it is possible to use a set of quarter wave plates disposed inside the upper and lower polarizing plates to facilitate the process of controlling the alignment of the molecules at the interface of the rubbing or optical alignment operations. More specifically, with the quarter wave plates, a slight offset of the liquid crystal molecules does not affect the brightness of the resulting display.

In the normally white mode, a high contrast ratio and brightness can be achieved without rubbing when the liquid crystal molecules are aligned homogenously in the off state and the quarter wave plates are disposed inside the upper and lower polarizing plates. More specifically, since the liquid crystal molecules are initially aligned randomly in an azimuthal direction and the incident light directed to the liquid crystal layer has circular polarization, the opposite circular polarization is produced with the light having a phase difference of π, regardless of the orientation of the liquid crystal molecules in the azimuthal direction.

As is well known in the art, the quarter wave plate and the polarizing plate on the output side may be positioned such that they allow the light to pass therethrough that has the circular polarization opposite to that on the incident side. With this configuration, the initially bright state can be achieved and the liquid crystal molecules become anchored to the substrate when a voltage is applied.

The liquid crystal display exhibits no phase retardation for the light propagating through the liquid crystal layer. Thus, the circular polarized light arrives at the substrate on the output side without being affected. The transmission of such circular polarized light is killed by the polarizer, i.e., only the light having the opposite circular polarization can be transmitted therethrough. The black state is accomplished accordingly.

The liquid crystal molecules are aligned in different directions within each pixel and a large viewing angle can be obtained even in the gray scale mode. In addition, no variation in the azimuthal direction is visible. The response speed is thus higher than the case where no quarter wave plate is used.

It is preferable that the pixels be apart from each other as much as possible. When the pixels are close to each other for convenience of design, a so-called "dot inversion driving" may advantageously be used that alternately changes the polarity of the adjacent pixels to ensure generation of the fringe field. The dot inversion also allows a reset operation in a single frame to change the display to the black state in order to use only the rapid response for display because the initial response of the liquid crystal is rather slow. Such a driving method may be used to enhance the edges of animated images. In the liquid crystal display according to the present invention, this produces a side or secondary benefit of increasing the apparent response speed.

The above-mentioned description has been made in conjunction with a transmissive type liquid crystal display. However, the same applies to a reflective type display by means of using a metal with high reflectance such as aluminum as a material of the pixel electrode. It is possible to provide good white appearance by means of forming irregularities on the surface of the pixel electrode or using a diffuser plate. In this embodiment, the color filter is omitted. However, a color liquid crystal display may be obtained by using a color filter layer disposed between the upper substrate 101 and the transparent electrode 102.

EXAMPLE 3

Example 1 was repeated to form an ITO electrode and a silicon nitride film through photolithography and a square pixel electrode 104 was formed. A liquid crystal panel was produced using the alignment layer "JALS-428" available from JSR and the liquid crystal having positive dielectric anisotropy "ZL14792" without a chiral agent. The alignment layer was subjected to rubbing along the diagonal line of the square, with the rubbing direction perpendicular to the alignment direction of the liquid crystal on the upper and lower substrates. In JALS-428, the liquid crystal is aligned perpendicular to the rubbing direction. The pretilt angle measured by the crystal-rotation method was approximately 0°. The cell was approximately 5 micrometers in thickness. A "New-Vac" film available from Sumitomo Chemical Co., Ltd. was used as a compensation film. The optical properties of the panel were measured. No gray scale inversion was found at a wide viewing angle.

Third Embodiment

Figure 10A:
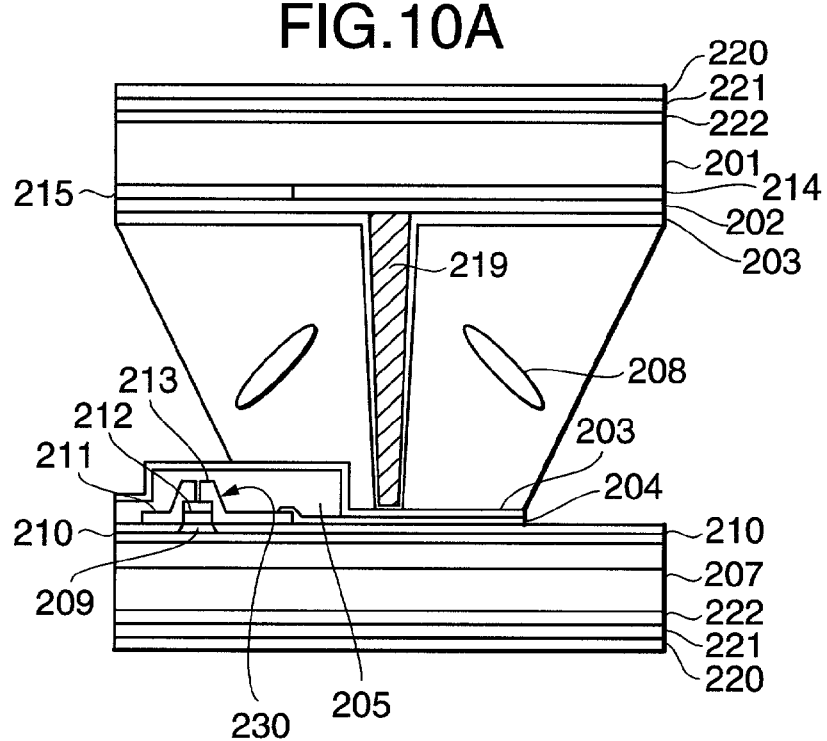
FIG. 10A is a cross-sectional view of a liquid crystal display having pixel electrodes with a concave portion formed therein, taken on the line B-B' in FIG. 10B.
Figure 10B:
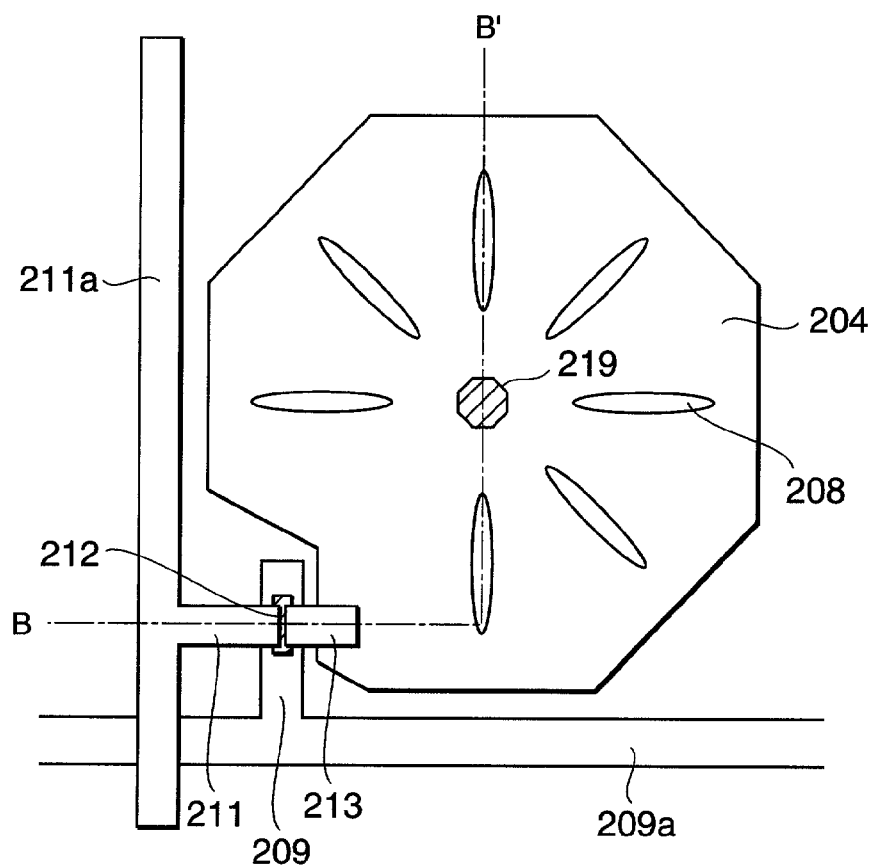
FIG. 10B is a plan view of the liquid crystal display shown in FIG. 10A.

Referring to FIGS. 10A and 10B, a liquid crystal display according to a third embodiment of the present invention is described. This liquid crystal display is based on the active matrix driving method. A pixel thereof is shown in cross section in FIG. 10A, taken on the line B-B' in FIG. 10B.

A color filter layer 214 and a light-shielding layer 215 are formed on an upper transparent substrate 201, on which common electrodes 202 are formed on the almost entire surface of a transparent substrate 201. A homeotropic alignment layer 203 is applied to the common electrodes 202. Rod-shaped spacers 219 are also formed on the common electrode 202, to which the homeotropic alignment layer 203 is applied.

A TFT 230 is provided on the upper surface of the lower substrate 207. A Cr gate electrode (scanning signal electrode) 209 is placed on the transistor 230. The gate electrode 209 is covered with a silicon nitride gate insulation film 210. A semiconductor film 212 is formed on the gate electrode 209 through the gate insulation film 210. The semiconductor film serves as an active layer of the TFT 230. A drain electrode 211 and a source electrode 213 are arranged such that they overlap with a portion of the pattern on the semiconductor film 212. The drain and source electrodes are formed of molybdenum. A silicon nitride protective film 205 is formed over all of the components. The drain electrode 211 and the source electrode 213 are overlapped with a portion of the pattern on the semiconductor film 212 through amorphous silicon films (not shown) doped with n impurities.

As shown in FIG. 10B, the drain electrode 211 is connected to the data line (video signal electrode) 211a. In other words, the drain electrode 211 is formed as a part of the data line 211a. Likewise, the gate electrode 209 forms a part of a scanning signal line 209a. A pixel electrode 204 connected to the source electrode 213 is provided on the gate insulation film 210, on which the homeotropic alignment layer 203 is formed.

In this embodiment, the source electrode 213 is connected to the pixel electrode 204 to apply video signals to the pixel electrode 204. Scanning signals are used to control ON/OFF of the video signals. The pixel electrode 204 has a symmetrical shape which is a hexagon in this embodiment. The pixel electrode 204 may have a circular, pentagonal, or square shape as shown in FIG. 2C. Liquid crystal molecules 208 having negative dielectric anisotropy are sandwiched between the upper and lower substrates.

Since the alignment layers 203 on the upper and lower substrates are of a homeotropic alignment type, the liquid crystal molecules 208 align generally perpendicular to the substrates when no voltage is applied.

When a voltage is applied to the gate electrode 209 to activate the TFT 220, the voltage is also applied to the source electrode 213. Electric fields are thus generated across the pixel electrode 204 and the opposing common electrode 202. Since the pixel electrode 204 has a symmetrical shape and the common electrode 202 has larger outside dimensions than the pixel electrode 204, the direction of the electric fields between the electrodes is not at right angles to the substrate. Instead, the electric fields are tilted in a direction toward the center of the pixel. As shown in FIG. 10A, the electric fields cause the liquid crystal molecules 208 with negative dielectric anisotropy to be oriented toward the center of the pixel in a symmetrical manner. As a result, multiple domains are produced while maintaining the symmetrical formation of the molecules. As in the first embodiment, the rod-shaped spacer 219 is located at the approximate symmetrical center of the pixel electrode 204. The spacer 219 plays an essential role to make up separate domains where the liquid crystal molecules 208 are aligned differently from those in the other domains. In other words, the boundaries of the distinct liquid crystal domains are defined accurately by the spacer 219. The advantageous effects obtained with the uniaxial negative compensation films and the quarter wave plates are similar to those obtained in the first embodiment. In particular, when the pixel electrode has a polygonal shape and the liquid crystal molecules has a large distribution in the azimuthal direction, the quarter wave plates can provide a higher luminance. The direction of the polarizing plates, that is, the direction with a wide viewing angle can be determined in any direction.

As apparent from the above, according to the present invention that uses the liquid crystal molecules with negative dielectric anisotropy, the pixel can be divided into multiple domains where the liquid crystal molecules are aligned differently from those in the other domains, without any special treatment of the alignment layer. The viewing angle can thus be increased.

For the active matrix liquid crystal display, the pixel electrodes may be affected by an undesired disclination line generated due to the lateral electric fields from the scanning signal electrode 209a and the video signal electrode 211a. The disclination line may disturb the orientation of the liquid crystal. This problem can be solved by means of increasing the distance between the scanning signal electrode 209a or the video signal electrode 211a and the pixel electrode 204. However, too large distance is not preferable by the considerations of the aperture ratio when the pixel is small. Another solution to the problem of the disturbance is to position a shielding electrode or a part of the pixel electrode 204 on the top surface of at least one of the scanning signal electrode 209a and the video signal electrode 211a. It should be noted that the aperture ratio becomes small when the pixel electrode 204 shields all of the scanning signal electrode 209a and the video signal electrode 211a. With this respect, the shielding electrode or a part of the pixel electrode 204 is placed on the top surface of at least one of the scanning signal electrode 209a and the video signal electrode 211a to prevent the aperture ratio from being lowered. The choice of the arrangements depends on, for example, the shape of the pixels, the arrangement of the scanning signal electrode 209a and the video signal electrode 211a, and procedures to create the shielding electrode.

Depending on the design of the pixel, only insufficient distance may be provided between the scanning signal electrode 209a or the video signal electrode 211a and the pixel electrode 204 cannot be increased for the reason of the aperture ratio. In order to ensure better control of the tilting angle of the liquid crystal molecules, an optical alignment layer may be used for the alignment layer. Polarized light at oblique angles or non-polarized light may be irradiated according to the nature and characteristics of the optical alignment layer. A small amount of monomer maybe contained in the liquid crystal to prevent the orientation of the liquid crystal from being disturbed. The monomer can be polymerized to retain a proper orientation.

For the purpose of stabilizing the boundaries of the domains, notches may be formed in the pixel as shown in FIGS. 4A to 4E. Alternatively, protrusions may be formed at each corner of the pixel electrode as shown in FIGS. 5A to 5H. A part of the pixel electrode may be removed to form the electrode-free areas 104d as shown in FIGS. 6A to 6G.

Figure 11A:
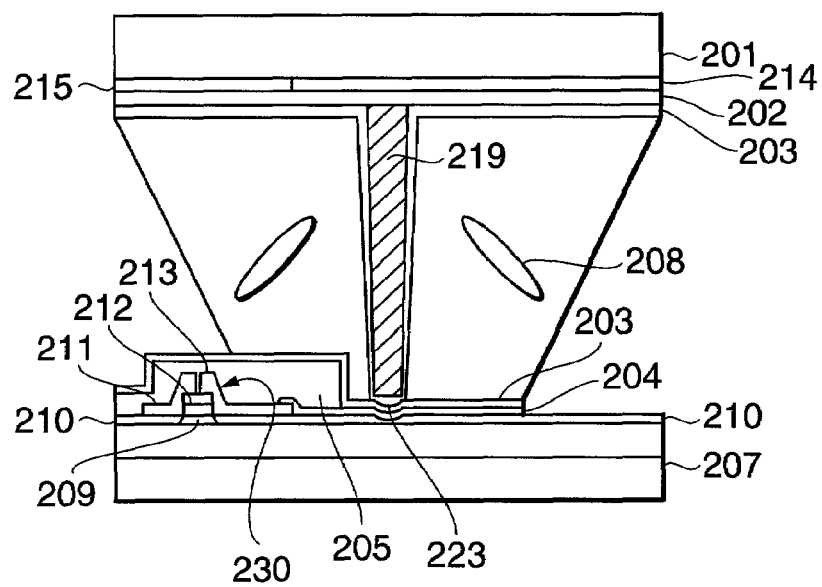
FIG. 11A is a cross-sectional view of the liquid crystal display according to the third embodiment of the present invention, taken on the line D-D' in FIG. 11B.
Figure 11B:
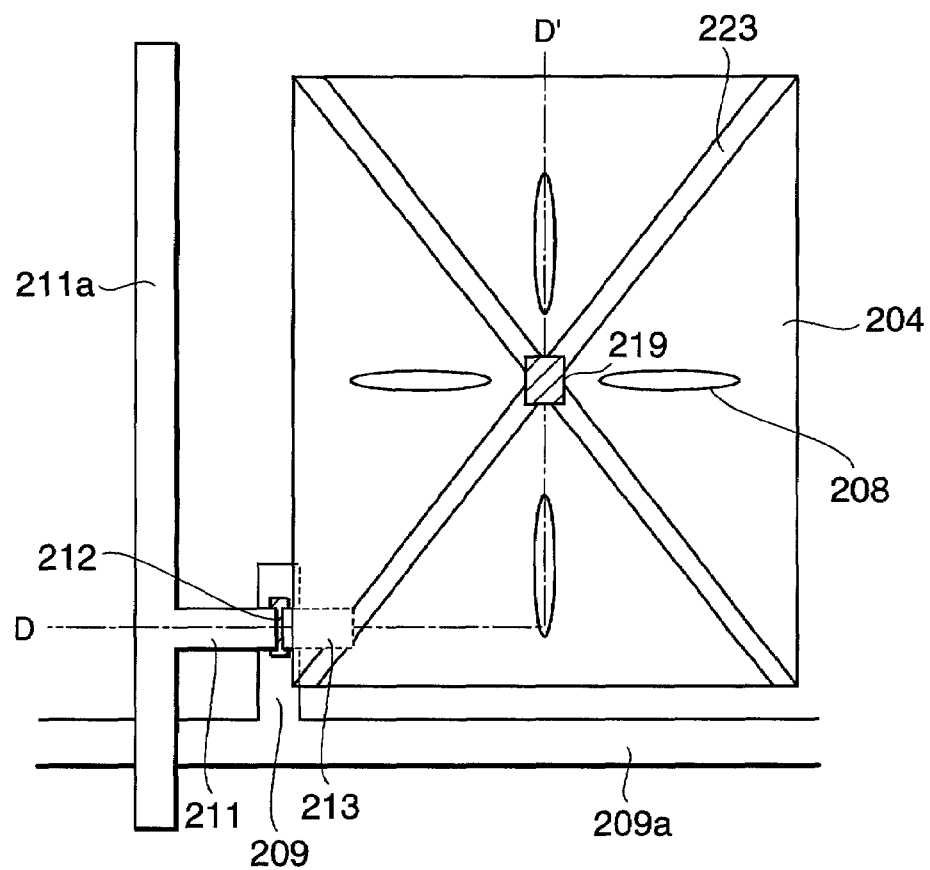
FIG. 11B is a plan view of the liquid crystal display shown in FIG. 11A.

Furthermore, as shown in FIGS. 11A and 11B, the concave portions 223 as shown in FIGS. 7A to 7G may be formed in a part of the square pixel electrode 204. The concave portions 223 extend radially outwardly from the center of the pixel electrode 204 to the corners thereof. The concave portions 223 may be formed either separately on the pixel electrode 204 or integrally therein. Other configurations and features of the liquid crystal display shown in FIGS. 11A and 11B are similar to those described in conjunction with FIGS. 10A and 10B except for the concave portions 223 on or in the pixel electrode 204. Similar components and parts are designated by like reference numerals and description of them will thus be omitted.

As in the first embodiment, a uniaxial negative compensation film may be placed between the polarizing plate and the glass substrate to cancel the phase retardation in the liquid crystal in the voltage-off state. The black on the display is very black even if the viewer moves several inches away from directly in front of either of the screen.

In principle, the liquid crystal molecules are aligned at right angles to the substrate when no voltage is applied. However, the alignment may be disturbed depending on, for example, characteristics of the cells. Under such circumstances, an additional film with positive dielectric anisotropy may be provided to compensate the disturbance.

In the above-mentioned description, it is assumed that the liquid crystal molecules have negative dielectric anisotropy and are aligned at right angles to the substrate when no voltage is applied. However, similar orientation can be achieved to the one described in the second embodiment when the liquid crystal molecules have positive dielectric anisotropy and are aligned in a twisted nematic manner in the off state. The viewing angle can also be increased. In this case, the liquid crystal layer is divided into four distinct domains as shown in FIGS. 8A and 8B. With the twisted nematic liquid crystal, the pixel preferably has a square shape. This also applies to the embodiments described below.

The present invention provides particularly significant effects with the active matrix liquid crystal display having a switching cell such as TFT. More particularly, in the case of the active matrix liquid crystal display with a typical TN mode, the microfabrication such as photoresist processing is required only for the substrate on which the active cells are formed. It is not necessary for the other substrate (which is typically referred to as a common electrode) to be subjected to such microfabrication. Instead, the electrode is formed over the entire surface of the substrate.

If nothing is done, the viewing angle is narrow. Generating multiple domains in the pixel to increase the viewing angle conventionally involves additional steps for the photoresist processing. Such additional steps should be eliminated because they lead reduction of production yields and undesired load/duty of production facilities. According to the present invention, it is possible to generate a multi-domain structure in the pixel without the photoresist processing, increasing the viewing angle.

A method for manufacturing the liquid crystal for the liquid crystal display according to the third embodiment is similar to the one described in conjunction with the first embodiment.

Next, an example of the third embodiment is described.

EXAMPLE 4

A substrate having the TFT array 230 of amorphous silicon was formed on the glass substrate through deposition and lithography. The TFT 230 comprises gate: chromium layer 209, silicon oxide or silicon nitride: gate insulation layer 210, amorphous silicon: semiconductor layer 212, and drain-source: molybdenum layer 211, 213, which were formed on the substrate 207 in this order. The source electrode 213 is connected to the square pixel electrode 204 formed of ITO. The protective film 205 of silicon oxide or silicon nitride was deposited over the components.

Color filter substrates with a black matrix, over which entire surface ITO had been deposited, were prepared as opposing substrates. The square spacer 219 whose sides are 5 micrometers long was formed at the symmetrical center of each pixel on the opposing substrates. The spacer was made of a photo-sensitive acrylic resin and had a height of 3.7 micrometers. The homeotropic alignment layer (available under the trade designation "SE 1211" from Nissan Chemical Industries, Ltd.) 203 was applied to the upper and lower substrates. The substrates were heated for 1 hour at 200° C. to dry the coatings. A sealant was applied along the periphery of the substrates. The panel was then heated to cure the sealant. Subsequently, nematic liquid crystal 208 with negative dielectric anisotropy was injected between the substrates. The liquid crystal had a refractive index anisotropy ($\Delta$n) of 0.096. An injection hole was sealed with a photo-curable resin.

As in Example 1, the panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. In addition, the pixels were observed under an optical microscope. There was no dark area along the transmission axis of the polarizing plate, providing a display with high luminance.

EXAMPLE 5

Example 4 was repeated to form a TFT substrate and the electrode-free areas 104d as shown in FIGS. 6A to 6G were formed in a part of the ITO electrode. In other words, Example 4 was repeated to produce a liquid crystal display panel except that the pixel electrode had electrode-free areas distributed along the diagonal lines of the square pixel electrode.

The optical properties of the panel thus obtained were measured. The results indicated that the panel has a high contrast ratio and high luminance over a wide viewing angle with less or no gray scale inversion. There was no dark area along the transmission axis of the polarizing plate, providing a display with high luminance.

EXAMPLE 6

Example 4 was repeated to produce a TFT substrate. A part of a gate insulation film was etched through photolithography as shown in FIG. 11B to form the concave portions 223. ITO was sputtered thereon to produce a configuration as shown in FIGS. 11A and 11B. As apparent from the figures, the concave portions were formed in a part of the ITO 204. A liquid crystal panel was thus obtained as in Example 4.

The optical properties of the panel thus obtained were measured. The results indicated that the panel has a high contrast ratio and high luminance over a wide viewing angle with less or no gray scale inversion. There was no dark area along the transmission axis of the polarizing plate, providing a display with high luminance.

EXAMPLE 7

Example 4 was repeated to form TFT on a glass substrate. The TFT comprises, as the one described in conjunction with Example 4, a gate-chromium layer, a silicon oxide or silicon nitride-gate insulation layer, an amorphous silicon-semiconductor layer, and a drain-source-molybdenum layer, which were formed on the substrate in this order. A silicon nitride was deposited over the components. A hexagonal pixel electrode was formed on the silicon nitride film. The pixel electrode was connected to the source electrode via a through-hole.

As in Example 4, color filter substrates with a black matrix, over which entire surface ITO had been deposited, were prepared as opposing substrates. A square spacer whose sides are 5 micrometers long was formed at the symmetrical center of each pixel on the opposing substrates. The spacer was made of a photo-sensitive acrylic resin and had a height of 4.0 micrometers. The homeotropic alignment layer (available under the trade designation "SE 1211" from Nissan Chemical Industries, Ltd.) was applied to the upper and lower substrates. The substrates were heated for 1 hour at 200° C. to dry the coatings. A sealant was applied along the periphery of the substrates. The panel was then heated to cure the sealant. Subsequently, nematic liquid crystal with negative dielectric anisotropy was injected between the substrates. The liquid crystal had a refractive index anisotropy ($\Delta$n) of 0.095. An injection hole was sealed with a photo-curable resin. As in Example 4, the panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. In addition, the pixels were observed under an optical microscope. There was no dark area along the transmission axis of the polarizing plate, providing a display with high luminance.

Fourth Embodiment

Figure 12A:
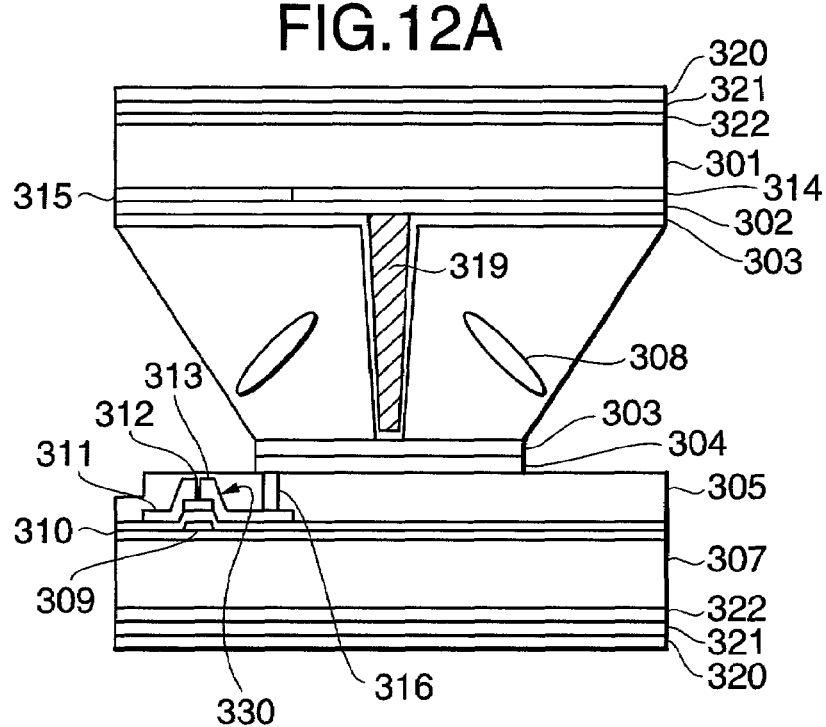
FIG. 12A is a cross-sectional view of a liquid crystal display according to a fourth embodiment of the present invention, taken on the line C-C' in FIG. 12B.
Figure 12B:
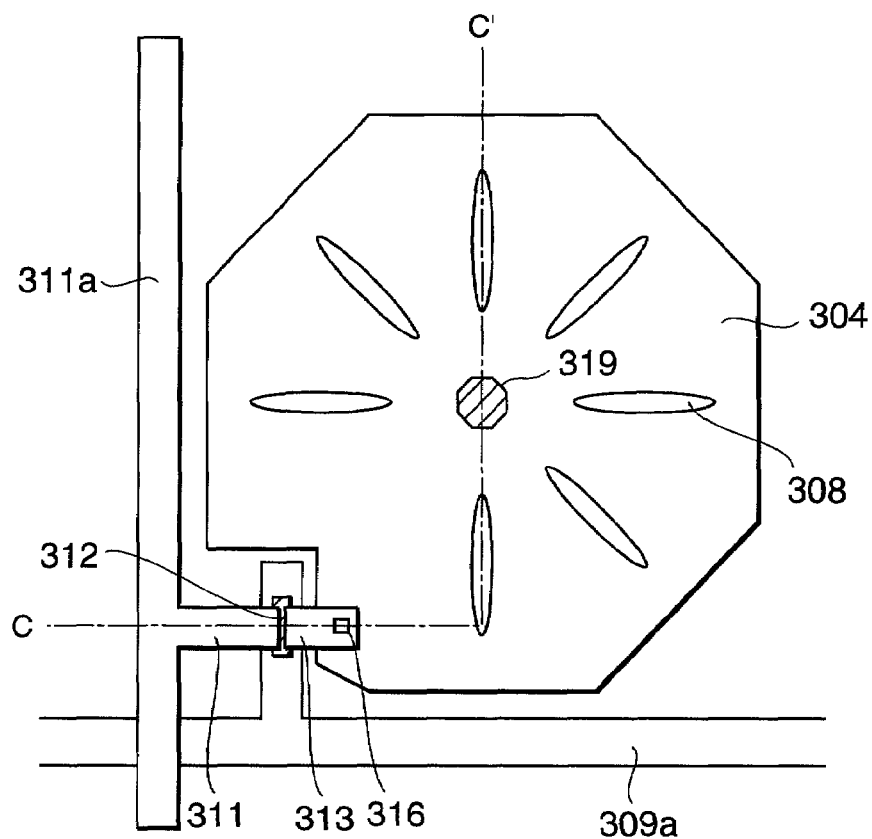
FIG. 12B is a plan view of the liquid crystal display shown in FIG. 12A.

Referring to FIGS. 12A and 12B, a liquid crystal display according to a fourth embodiment of the present invention is described. This liquid crystal display is based on the active matrix driving method as in the third embodiment. A pixel thereof is shown in cross section in FIG. 12A, taken on the line C-C' in FIG. 12B.

The fourth embodiment is different from the third embodiment in that a pixel electrode 304 and a source electrode 313 are connected via a through-hole 316 rather than directly.

A color filter layer 314 and a light-shielding layer 315 are formed on an upper transparent substrate 301, on which common electrodes 302 are formed on the almost entire surface of a transparent substrate 301. A homeotropic alignment layer 303 is applied to the common electrodes 302.

A TFT 330 is provided on the upper surface of the lower substrate 307. A Cr gate electrode (scanning signal electrode) 309 is placed on the transistor 330. The gate electrode 309 is covered with a gate insulation film 310 of silicon oxide or silicon nitride. A semiconductor film 312 of amorphous silicon is formed on the gate electrode 309 through the gate insulation film 310. The semiconductor film serves as an active layer of the TFT 330. A drain electrode 311 and a source electrode 313 are arranged such that they overlap with a portion of the pattern on the semiconductor film 312. The drain and source electrodes are formed of molybdenum.

A protective film 310 of, for example, silicon nitride is formed over all of the components. The protective film 310 may be formed of silicon nitride alone, or alternatively, silicon nitride covered with another organic film of, for example, an acrylic resin. The drain electrode 311 and the source electrode 313 are overlapped with a portion of the pattern on the semiconductor film 312 through amorphous silicon films (not shown) doped with n impurities. The pixel electrode 304 is connected to the source electrode 313 via the through-hole 316.

As shown in FIG. 12B, the drain electrode 311 is connected to the data line (video signal electrode) 311a. In other words, the drain electrode 311 is formed as a part of the data line 311a. Likewise, the gate electrode 309 forms a part of a scanning signal line 309a. A pixel electrode 304 connected to the source electrode 313 is provided on the protective film 305, on which the homeotropic alignment layer 303 is formed.

In this embodiment, the source electrode 313 is connected to the pixel electrode 304 to apply video signals to the pixel electrode 304. Scanning signals are used to control ON/OFF of the video signals. The pixel electrode 304 has a symmetrical shape which is a octagon in this embodiment. The pixel electrode 304 may have a circular, pentagonal, or square shape as shown in FIG. 2C.

As in the third embodiment, rod-shaped spacer 319 is provided on the common electrode 302 to which the homeotropic alignment layer 303 is applied. The homeotropic alignment layer 303 is also applied to the pixel electrode 304. The liquid crystal molecules 308 align generally perpendicular to the substrates when no voltage is applied.

When a voltage is applied to the gate electrode 309 to activate the TFT, the voltage is also applied to the source electrode 313. Electric fields are thus generated across the pixel electrode 304 and the opposing common electrode 302. Since the pixel electrode 304 has a symmetrical shape and the common electrode 302 has larger outside dimensions than the pixel electrode 304, the direction of the electric fields between the electrodes is not at right angles to the substrate. Instead, the electric fields are tilted in a direction toward the center of the pixel. The electric fields cause the liquid crystal molecules 308 with negative dielectric anisotropy to be oriented toward the center of the pixel in a symmetrical manner. As a result, multiple domains are produced while maintaining the symmetrical formation of the molecules.

The pixel can be divided automatically into multiple domains where the liquid crystal molecules are aligned differently from those in the other domains, without any special treatment of the alignment layer. The viewing angle can thus be increased.

As in the first and second embodiments, the spacer is located at the approximate symmetrical center of the pixel electrode. The spacer plays an essential role to make up separate domains where the liquid crystal molecules are aligned differently from those in the other domains.

The advantageous effects obtained with the uniaxial negative compensation films and the quarter wave plates are similar to those obtained in the first and third embodiments. In particular, when the pixel electrode has a polygonal shape and the liquid crystal molecules has a large distribution in the azimuthal direction, the quarter wave plates can provide a higher luminance. The direction of the polarizing plates, that is, the direction with a wide viewing angle can be determined in any direction.

As apparent from the above, according to the present invention that uses the liquid crystal molecules with negative dielectric anisotropy, the pixel can be divided into multiple domains where the liquid crystal molecules are aligned differently from those in the other domains, without any special treatment of the alignment layer. The viewing angle can thus be increased.

For the active matrix liquid crystal display, the pixel electrodes may be affected by an undesired disclination line generated due to the lateral electric fields from the scanning signal electrode 309a and the video signal electrode 311a. The disclination line may disturb the orientation of the liquid crystal. This problem can be solved by means of increasing the distance between the scanning signal electrode 309a or the video signal electrode 311a and the pixel electrode 304. However, too large distance is not preferable by the considerations of the aperture ratio when the pixel is small. Another solution to the problem of the disturbance is to position a shielding electrode or a part of the pixel electrode 304 on the top surface of at least one of the scanning signal electrode 309a and the video signal electrode 311a. It should be noted that the aperture ratio becomes small when the pixel electrode 304 shields all of the scanning signal electrode 309a and the video signal electrode 311a. With this respect, the shielding electrode or a part of the pixel electrode 304 is placed on the top surface of at least one of the scanning signal electrode 309a and the video signal electrode 311a to prevent the aperture ratio from being lowered. The choice of the arrangements depends on, for example, the shape of the pixels, the arrangement of the scanning signal electrode 309a and the video signal electrode 311a, and procedures to create the shielding electrode.

Depending on the design of the pixel, only insufficient distance may be provided between the scanning signal electrode 309a or the video signal electrode 311a and the pixel electrode 304 cannot be increased for the reason of the aperture ratio. In order to ensure better control of the tilting angle of the liquid crystal molecules, an optical alignment layer may be used for the alignment layer. Polarized light at oblique angles or non-polarized light may be irradiated according to the nature and characteristics of the optical alignment layer. A small amount of monomer may be contained in the liquid crystal to prevent the orientation of the liquid crystal from being disturbed. The monomer can be polymerized to retain a proper orientation.

For the purpose of stabilizing the boundaries of the domains, notches may be formed in the pixel as shown in FIGS. 4A to 4E. Alternatively, protrusions may be formed at each corner of the pixel electrode as shown in FIGS. 5A to 5H. A part of the pixel electrode may be removed to form the electrode-free areas as shown in FIGS. 6A to 6G.

Furthermore, as shown in FIGS. 11A and 11B, the concave portions as shown in FIGS. 7A to 7G may be formed in a part of the pixel electrode. The concave portions may be formed either separately on the pixel electrode or integrally therein.

As in the first embodiment, a uniaxial negative compensation film may be placed between the polarizing plate and the glass substrate to cancel the phase retardation in the liquid crystal in the voltage-off state. The black on the display is very black even if the viewer moves several inches away from directly in front of either of the screen.

In principle, the liquid crystal molecules are aligned at right angles to the substrate when no voltage is applied. However, the alignment may be disturbed depending on, for example, characteristics of the cells. Under such circumstances, an additional film with positive dielectric anisotropy may be provided to compensate the disturbance.

In the above-mentioned description, it is assumed that the liquid crystal molecules have negative dielectric anisotropy and are aligned at right angles to the substrate when no voltage is applied. However, similar orientation can be achieved to the one described in the second embodiment when the liquid crystal molecules have positive dielectric anisotropy and are aligned in a twisted nematic manner when no voltage is applied. The viewing angle can also be increased. In this case, the liquid crystal layer is divided into four distinct domains as shown in FIGS. 8A and 8B. With the twisted nematic liquid crystal, the pixel preferably has a square shape.

When the pixel is relatively large, a voltage that is approximately equal to a threshold voltage (either higher or lower than the threshold voltage) may be applied previously before initialization of each frame for driving the display. This defines the tilt angle of the liquid crystal molecules. The domains can be formed more rapidly and positively than in the case where the liquid crystal display is driven without application of such a voltage.

When a voltage higher than the threshold value is applied to increase the response speed of the liquid crystal display, a leakage of light may occur around the periphery of each pixel where the liquid crystals molecules begin to tilt. The leakage of light leads to a degradation of the contrast ratios. Shielding of the periphery can prevent the degradation of the contrast ratios.

The liquid crystal for the liquid crystal display according to the fourth embodiment may be produced in the same manner as in the first embodiment.

Next, an example of the fourth embodiment is described.

EXAMPLE 8

Example 4 was repeated to form the TFT 330 on the glass substrate 307. The TFT 330 comprises, as the one described in conjunction with Example 4, the gate-chromium layer 309, the silicon nitride-gate insulation layer 310, the amorphous silicon-semiconductor layer 312, and the drain-source-molybdenum layers 311 and 313, which were formed on the substrate 307 in this order. The silicon nitride 305 was deposited over the components. An octagonal pixel electrode 304 was formed on the silicon nitride film 305. The pixel electrode 304 is connected to the source electrode 313 via the through-hole 316.

As in Example 4, color filter substrates with a black matrix, over which entire surface ITO had been deposited, were prepared as opposing substrates. The homeotropic alignment layer (available under the trade designation "SE 1211" from Nissan Chemical Industries, Ltd.) 303 was applied to the upper and lower substrates. The substrates were heated for 1 hour at 200° C. to dry the coatings. A sealant was applied along the periphery of the substrates. The spacers were sprayed, and the panel was then heated to cure the sealant. Subsequently, nematic liquid crystal 308 with negative dielectric anisotropy was injected between the substrates. An injection hole was sealed with a photo-curable resin. The panel was then provided with a negative compensation film that is of the same refractive index anisotropy in absolute value as the liquid crystal layer but different in sign. The polarizing plates and the quarter wave plates were disposed on the upper and lower substrates, with the transmission axes thereof being perpendicular to each other.

The optical properties of the panel thus obtained were measured. The results indicated that the panel has a high contrast ratio over a wide viewing angle with less or no gray scale inversion.

EXAMPLE 9

Example 8 was repeated to prepare a TFT substrate and a color filter except that the pixel electrode 312 has a square shape. An optical alignment layer was applied only on the side of the TFT substrate. A polarized ultraviolet radiation was directed at oblique angles from four directions through a mask such that the domains as shown in FIGS. 7A to 7G were obtained. The ultraviolet radiation is directed to generate a pretilt angle, with the domain boundaries defined along the diagonal line of the square. Thus, the diagonal lines of the pixel make up the boundaries of the domains where the liquid crystal molecules are aligned in different directions.

As in Example 6, the sealant was applied and the liquid crystal was injected before the panel was sealed. The panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. In addition, the pixels were observed under an optical microscope. There was no dark area along the transmission axis of the polarizing plate, providing a display with high luminance. The pixels were also observed under the optical microscope during the driving operation. As a result, no abnormal disclination was visible within the pixel that was observed slightly in the case of Example 6.

When the transmission axes of the polarizing plates were aligned with the top-to-bottom direction of the panel, the resulting display has a particularly high contrast ratio in the top-to-bottom direction. When the transmission axes of the polarizing plates are set at 45 degrees, the optical properties were not changed much. A particularly high contrast ratio was obtained in the direction at 45 degrees to the surface of the panel.

EXAMPLE 10

Example 8 was repeated to prepare a TFT substrate and a color filter substrate. A rod (6 micrometer height) serving as a spacer was produced at the approximate symmetrical center of the pixel electrode through photolithography with a negative resist. As in Example 8, the homeotropic alignment layers (available under the trade designation "SE 1211" from Nissan Chemical Industries, Ltd.) were applied to the upper and lower substrates. The substrates were heated for 1 hour at 200° C. to dry the coatings. A panel was thus obtained.

Subsequently, a liquid crystal solution was injected that contains nematic liquid crystal (available under the trade designation "MJ95955" from Merck Japan Ltd.) with negative dielectric anisotropy, an ultraviolet-curable monomer (available under the trade designation "KAYARAD PET-30" from Nippon Kayaku Co., Ltd.) (0.2 wt. % relative to the total weight of the liquid crystal), and an initiator (tradesman "IRGANOX 907", 5 wt. % relative to the total weight of the monomer). The panel assembly was sealed with great care not to cause the liquid crystal solution to be exposed to light. Ultraviolet radiation was directed to the entire surface of the panel from the side of the TFT while applying voltages of 0 V and 3 V to the common electrode and the pixel electrode, respectively, to polymerize the monomer contained in the liquid crystal. The panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. The pixels were observed under the optical microscope during the driving operation as in Example 9. As a result, no abnormal disclination was visible within the pixel that was observed slightly in the case of Example 8.

EXAMPLE 11

Example 8 was repeated to prepare a TFT substrate and a color filter except that the pixel electrode 312 has a square shape. A panel was prepared in the same manner as in Example 8 and a response speed thereof was measured.

It should be noted that the amount of the transmitted light was not constant even 40 ms after the application of a 5-v voltage when the driving voltage of 5 V was applied without any bias voltage. On the other hand, when a bias voltage of 2.2 V was applied first and the driving voltage of 5 V was applied, the amount of the transmitted light becomes constant 20 ms after the application of the 5-v voltage.

Fifth Embodiment

Figure 13A:
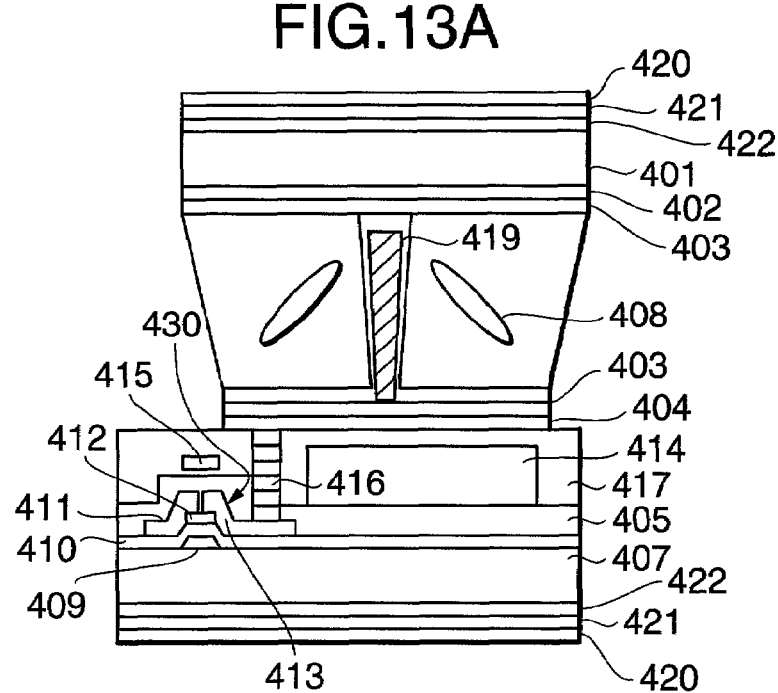
FIG. 13A is a cross-sectional view of a liquid crystal display according to a fifth embodiment of the present invention, taken on the line D-D' in FIG. 13B.
Figure 13B:
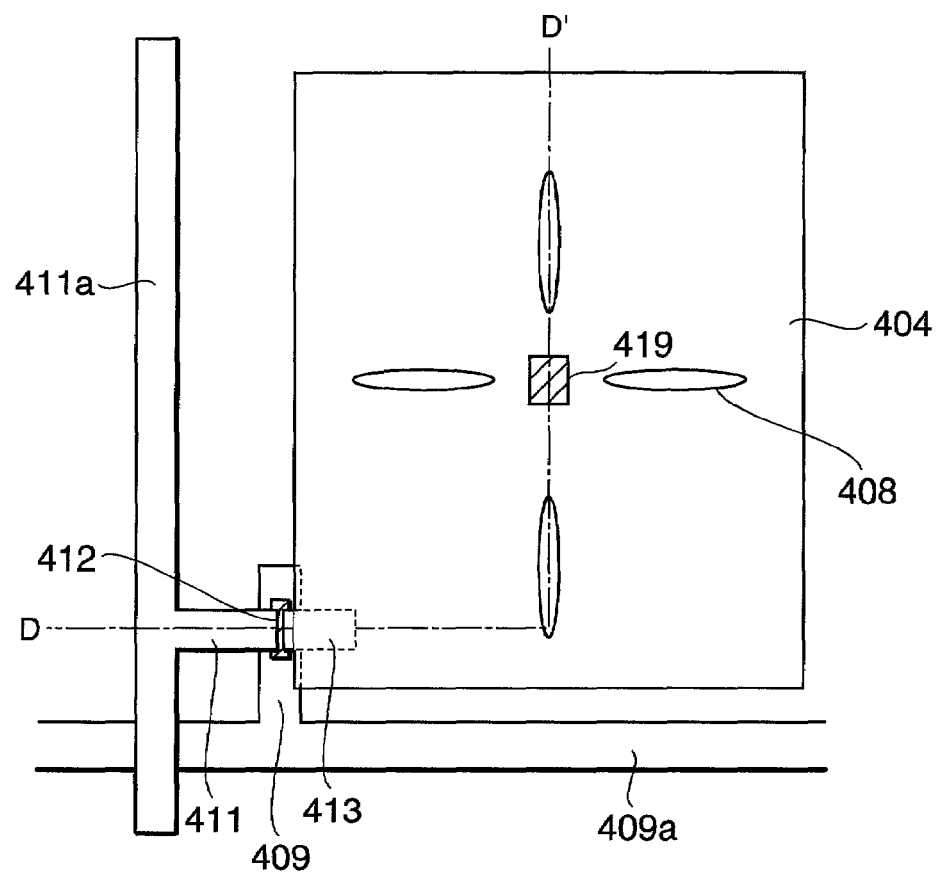
FIG. 13B is a plan view of the liquid crystal display shown in FIG. 13A.

Referring to FIGS. 13A and 13B, a liquid crystal display according to a fourth embodiment of the present invention is described. The liquid crystal display is based on the active matrix driving method as in the third and fourth embodiments A pixel thereof is shown in cross section in FIG. 13A, taken on the line D-D' in FIG. 13B. In the fifth embodiment, the color filter layer is provided on the side of the lower substrate.

Common electrodes 402 are formed on the almost entire surface of an upper transparent substrate 401. A homeotropic alignment layer 403 is applied over the common electrode 402. A TFT 430 is provided on the lower substrate 407. A Cr gate electrode (scanning signal electrode) 409 is placed on the transistor 430. The gate electrode 409 is covered with a gate insulation film 410 of silicon nitride. A semiconductor film 412 of amorphous silicon is formed on the gate electrode 409 through the gate insulation film 410. The semiconductor film serves as an active layer of the TFT 430. A drain electrode 411 and a source electrode 413 are arranged such that they overlap with a portion of the pattern on the semiconductor film 412. The drain and source electrodes are formed of molybdenum. A protective film 405 of silicon nitride is formed over all of the components. The drain electrode 411 and the source electrode 413 are overlapped with a portion of the pattern on the semiconductor film 412 through amorphous silicon films (not shown) doped with n impurities.

As shown in FIG. 13B, the drain electrode 411 is connected to the data line (video signal electrode) 411a. In other words, the drain electrode 411 is formed as a part of the data line 411a. Likewise, the gate electrode 409 forms a part of a scanning signal line 409a.

In the fifth embodiment, a color filter layer 414 is formed on the protective layer 405. In addition, a light-shielding film 415 is formed on the protective layer 405 to cover an active layer 412 of the TFT. The color filter layer 414 and the light-shielding layer 415 are covered with an overcoat layer 417. The overcoat layer 417 is formed of a transparent insulation material that is hardly suffered from charge buildup.

As in the third embodiment, a rod-shaped spacer 419 may be formed on the common electrode 402. However, it is preferable the spacer be formed on the pixel electrode 404 in order to increase the accuracy of the edge positioning between the upper and lower substrates. In addition, the spacer may be formed after the homeotropic alignment layer 403 is applied on the common electrode 402 and the pixel electrode 404. FIGS. 13A and 13B show the case where the homeotropic alignment layer 403 is applied after the rod-shaped spacer 419 is formed on the pixel electrode 404.

The pixel electrode 404 connected to the source electrode 413 via a through-hole 416 is formed on the overcoat layer 417, on which the homeotropic alignment layer 403 is formed. Because of the presence of the homeotropic alignment layer 403, the liquid crystal molecules 408 align generally perpendicular to the substrates when no voltage is applied.

When a voltage is applied to the gate electrode 409 to activate the TFT, the voltage is also applied to the source electrode 413. Electric fields are thus generated across the pixel electrode 404 and the opposing common electrode 402. As in the above-mentioned embodiments, the pixel electrode 404 has a symmetrical shape and the common electrode 402 has larger outside dimensions than the pixel electrode 404, the direction of the electric fields between the electrodes is not at right angles to the substrate. Instead, the electric fields are tilted in a direction toward the center of the pixel. The electric fields cause the liquid crystal molecules 408 with negative dielectric anisotropy to be oriented toward the center of the pixel in a symmetrical manner. As a result, multiple domains are produced while maintaining the symmetrical formation of the molecules.

In the method according to the present invention, the pixel can be divided automatically into multiple domains where the liquid crystal molecules are aligned differently from those in the other domains, without any special treatment of the alignment layer. The viewing angle can thus be increased.

As in the above-mentioned embodiments, the rod-shaped spacer is located at the approximate symmetrical center of the pixel electrode. The spacer plays an essential role to make up separate domains where the liquid crystal molecules are aligned differently from those in the other domains. The advantageous effects obtained with the uniaxial negative compensation films and the quarter wave plates are similar to those obtained in the first and third embodiments. As apparent from the above, according to the present invention that uses the liquid crystal molecules with negative dielectric anisotropy, the pixel can be divided into multiple domains where the liquid crystal molecules are aligned differently from those in the other domains, without any special treatment of the alignment layer. The viewing angle can thus be increased.

In the fifth embodiment, the pixel electrodes 404 are sufficiently apart from a gate line (scanning signal line) 409a and a drain line (video signal line) 411a. The orientation of the liquid crystal may hardly be affected by the electric fields generated by these electrodes. It is, however, possible to provide a shielding electrode on either or both electrodes in order to avoid any possible influence by the external electric fields.

In the fifth embodiment, the pixel electrode 404 is disposed between the color filter layer 414 and the liquid crystal layer 408. This eliminates edge-positioning between the color filter layer 414 and the pixel electrode 404. The accuracy of substrate lamination is thus improved significantly.

Such a remarkable, advantageous effect cannot be obtained with a common electrode having an aperture or a cutout formed therein. In addition, the influence by the lateral electric fields from the scanning signal electrode 409a and the video signal electrode 411 can be reduced by means of positioning the pixel electrode 404 between the color filter layer 414 and the liquid crystal layer 408.

This configuration provides a solution against the problem of color distortion in the color filter layer 414 which otherwise maybe caused due to the charge buildup on the filter, particularly in the IPS liquid crystal display devices and homeotropic-aligned liquid crystal display devices.

As in the third and fourth embodiments, the tilting angle of the liquid crystal molecules may be controlled more precisely and positively. To this end, an optical alignment layer may be used for the alignment layer and polarized light at oblique angles or non-polarized light may be irradiated according to the nature and characteristics of the optical alignment layer. A small amount of monomer may be contained in the liquid crystal to prevent the orientation of the liquid crystal from being disturbed. The monomer can be polymerized to retain a proper orientation.

When the transmission axes of the polarizing plates are perpendicular to each other, the resulting liquid crystal display is in the normally black mode. Uniaxial negative and positive compensation films maybe combined with the polarizing plates to reduce viewing angle dependence of the initial phase retardation. The result is that the black state can be achieved over the full viewing angle. The image quality is improved and the viewing angle is increased.

In the above-mentioned description, it is assumed that the liquid crystal molecules have negative dielectric anisotropy and are aligned at right angles to the substrate when no voltage is applied. However, similar orientation can be achieved to the one described in the second embodiment when the liquid crystal molecules have positive dielectric anisotropy and are aligned in a twisted nematic manner in the off state. The viewing angle can also be increased accordingly. In this case, the liquid crystal layer is divided into four distinct domains as shown in FIGS. 8A and 8B. With the twisted nematic liquid crystal, the pixel preferably has a square shape.

The liquid crystal for the liquid crystal display according to the fifth embodiment may be produced in the same manner as in the first embodiment.

Next, an example of the fifth embodiment is described.

EXAMPLE 12

Example 4 was repeated to produce a substrate having the TFT array 430 of amorphous silicon was formed on the glass substrate 407 through deposition and lithography. The TFT 430 comprises the gate-chromium layer 409, the silicon oxide or silicon nitride-gate insulation layer 410, the amorphous silicon-semiconductor layer 412, and the drain-source-molybdenum layers 411 and 413, which were formed on the substrate in this order. A protective film was formed on the gate insulation film 410 to cover the drain electrode 411, the source electrode 413 and the semiconductor film 412.

A color filter layer and a light-shielding layer were formed on the protective film 405. The color filter layer 414 may be formed through photolithography by using a resin film containing, for example, a red, green, or blue dye or pigment. The light-shielding layer 415 was formed by using a photo-sensitive resin containing a black dye or pigment. Alternatively, the light-shielding layer 415 may be formed by using a metal.

The color filter layer 414 was formed by using a pigment-dispersed resist containing, for example, a red pigment that provides desired optical properties dispersed in an acrylic negative photo-sensitive resin. The pigment-dispersed resist was applied to the protective film to form a resist film. The resist film was exposed to light with a photo-mask to achieve selective exposure of predetermined areas on the resist film, that is, the areas of the pixels arranged in a matrix form. After the exposure, the film was developed with a developing solution to form a predetermined pattern. The similar procedure was repeated, for example, three times for each color of red, blue, and green to form the color filter layer 414.

The overcoat layer 417 made of a transparent insulation material was formed on the color filter layer 414 and the light-shielding layer 415. The material of the overcoat layer 417 may be a thermosetting resin such as an acrylic resin. While the overcoat layer 417 in this embodiment was made of a thermosetting resin such as an acrylic resin, it maybe formed of a photo-curable transparent resin.

Finally, the square pixel electrode 404 connected to the source electrode 413 via the through-hole 416 was formed on the overcoat layer 417. A 3.5-micrometer height, rod-shaped spacer whose sides are 5 micrometers long was formed at the symmetrical center of the pixel electrode with a photo-sensitive acrylic resin.

As the opposing substrates, glass substrates were prepared having the ITO film sputtered over the entire surface thereof. As in Example 4, the homeotropic alignment layer (available under the trade designation "SE 1211" from Nissan Chemical Industries, Ltd.) 403 was applied to the upper and lower substrates. The substrates were heated for 1 hour at 200° C. to dry the coatings. A sealant was applied along the periphery of the substrates. The sealant was then cured by heat. Subsequently, nematic liquid crystal with negative dielectric anisotropy was injected that had a refractive index anisotropy (Δn) of 0.096. An injection hole was sealed with a photo-curable resin. The panel was then provided with a negative compensation film that is of the same refractive index anisotropy in absolute value as the liquid crystal layer but different in sign. The polarizing plates and the quarter wave plates were disposed on the upper and lower substrates, with the transmission axis of the polarizing plate set at 45 degrees to the slow axis of the quarter wave plate, such that the opposite circular polarization was achieved.

The optical properties of the panel thus obtained were measured. The results indicated that the panel has a high contrast ratio over a wide viewing angle with less or no gray scale inversion. No edge-positioning was required to assemble the upper and lower substrates, even when the pixels were small.

EXAMPLE 13

Example 11 was repeated to produce a panel except that the pixel electrode has protrusions as shown in FIGS. 5A to 5H.

The optical properties of the panel thus obtained were measured. The results indicated that the panel has a high contrast ratio over a wide viewing angle with less or no gray scale inversion. No defect of a disclination line was visible within the pixel that was observed slightly in the case of Example 11.

EXAMPLE 14

Example 12 was repeated to produce a TFT substrate on which the color filter layer 414 and the overcoat layer 417 were formed to create produce a square pixel electrode. As in Example 3, the liquid crystal panel was produced using the alignment layer "JALS-428" available from JSR and the liquid crystal having positive dielectric anisotropy "ZL14792" without a chiral agent. They were subjected to rubbing as in Example 3. The procedures in Example 9 were repeated to provide a liquid crystal panel except that the uniaxial negative compensation film was not used.

The optical properties of the panel thus obtained were measured. The results indicated that the panel has a high contrast ratio over a wide viewing angle with less or no gray scale inversion. No edge-positioning was required to assemble the upper and lower substrates, even when the pixels were small. Furthermore, the luminance was not affected by a possible offset of the rubbing direction.

EXAMPLE 15

Example 13 was repeated to produce a panel except that the pixel electrode has protrusions as shown in FIGS. 5A to 5H.

The optical properties of the panel thus obtained were measured. The results indicated that the panel has a high contrast ratio over a wide viewing angle with less or no gray scale inversion.

EXAMPLE 16

Example 4 was repeated to produce a panel except that the quarter wave plate was not used. Then, the response speed of the panel was measured. As a result, it was found that the amount of the transmitted light was not constant even 40 ms after the application of a 5-v voltage when the driving voltage of 5 V was applied without any bias voltage. On the other hand, when a bias voltage of 2.2 V was applied first and the driving voltage of 5 V was applied, the amount of the transmitted light becomes constant 20 ms after the application of the 5-v voltage. These results indicate that the application of the bias voltage increases the response speed. However, the contrast ratio was decreased from 2,300 for 0 V without bias voltage to 130 with the bias voltage of 2.2 V.

The leakage of light around the pixel is the major cause of this. Therefore, the corresponding area was shielded with a black matrix. The contrast ratio was as high as 2,000.

The amount of the transmitted light became constant 30 ms after the application of the 5-V voltage without the bias voltage. Under this condition, when a bias voltage of 2.2 V was applied first and the driving voltage of 5 V was applied, the amount of the transmitted light becomes constant 10 ms after the application of the 5-v voltage. These results indicate that the quarter wave plate substantially increases the response speed.

EXAMPLE 17

Example 12 was repeated to provide a panel except that the spacer 419 had a height of 2 micrometers, the homeotropic alignment layer (available under the trade designation "SE 1211" from Nissan Chemical Industries, Ltd.) was used in place of the liquid crystal alignment layer, and no rubbing was made. Then, the liquid crystal with negative dielectric anisotropy was injected that had a refractive index anisotropy (Δn) of 0.1669. An injection hole was sealed. As in Example 4, the uniaxial negative compensation films, the quarter wave plates, and the polarizing plates were disposed to produce a liquid crystal panel.

The optical properties of the panel thus obtained were measured. The results indicated that the panel has a high contrast ratio over a wide viewing angle with less or no gray scale inversion. There was no dark area along the transmission axis of the polarizing plate, providing a display with high luminance.

This panel was driven with application of such voltage that provides the black state for the latter 8.3 ms of each frame of 16.7 ms. As a result, animated images were clearly visible.

EXAMPLE 18

Figure 14:
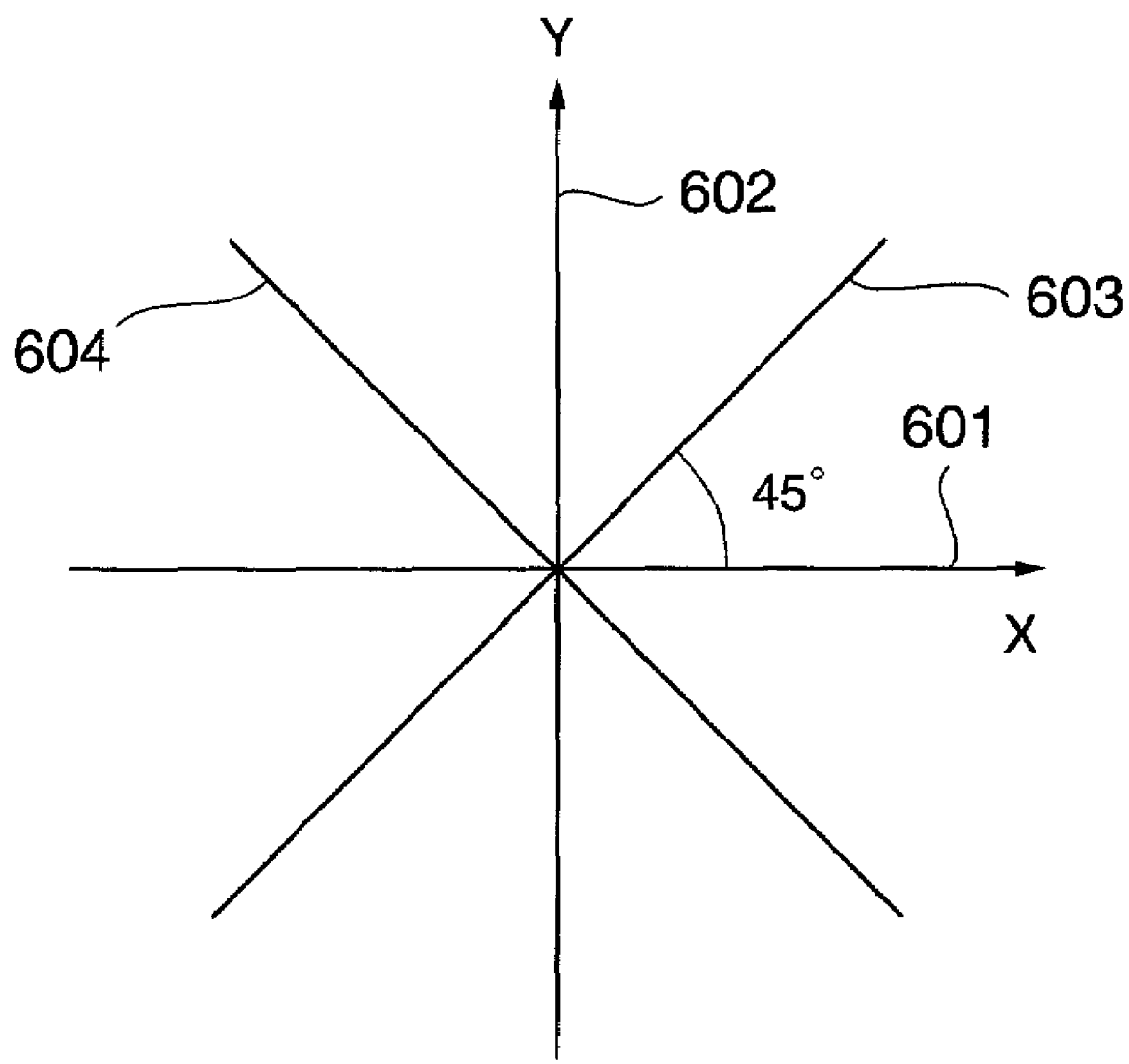
FIG. 14 is a plan view of transmission axis of polarizing plates and slow axes of quarter wave plates and half wave plates.

Example 4 was repeated to produce a liquid crystal panel on which half wave plates were laminated in place of the uniaxial negative compensation films. As shown in FIG. 14, the transmission axis of the polarizing plates and the slow axes of the quarter wave plates and the half wave plates were set as follows. The direction 601 of the transmission axis of the polarizing plate on the lower substrate (TFT substrate) is perpendicular to the direction 602 of the polarizing plate on the upper substrate (color filter substrate).

The direction 603 of the slow axis of the half wave plate on the lower substrate (TFT substrate), which is the same direction as the slow axis of the quarter wave plate on the upper substrate (color filter substrate), is perpendicular to the direction 604 of the slow axis of the quarter wave plate on the lower substrate (TFT substrate), which is the same direction as the slow axis of the half wave plate on the upper substrate (color filter substrate). The direction of the slow axis 603 of the half wave plate on the lower substrate (TFT substrate) is rotated counter-clockwise at 45 degrees with respect to the direction 601 of the transmission axis of the polarizing plate on the lower substrate (TFT substrate).

The optical properties of the panel thus obtained were measured. The results indicated that the panel has a high contrast ratio over a wide viewing angle with less or no gray scale inversion. The pixels were observed under an optical microscope. As a result, there was no dark area along the transmission axis of the polarizing plate, providing a display with high luminance.

The present invention is not limited to the liquid crystal display devices comprising the rod-shaped spacers. Projections, ridges, or protrusions may be provided in place of the spacers to offer similar effects of generating the multi-domain structures.

An embodiment with the protrusions is described below.

Sixth Embodiment

Figure 15A:
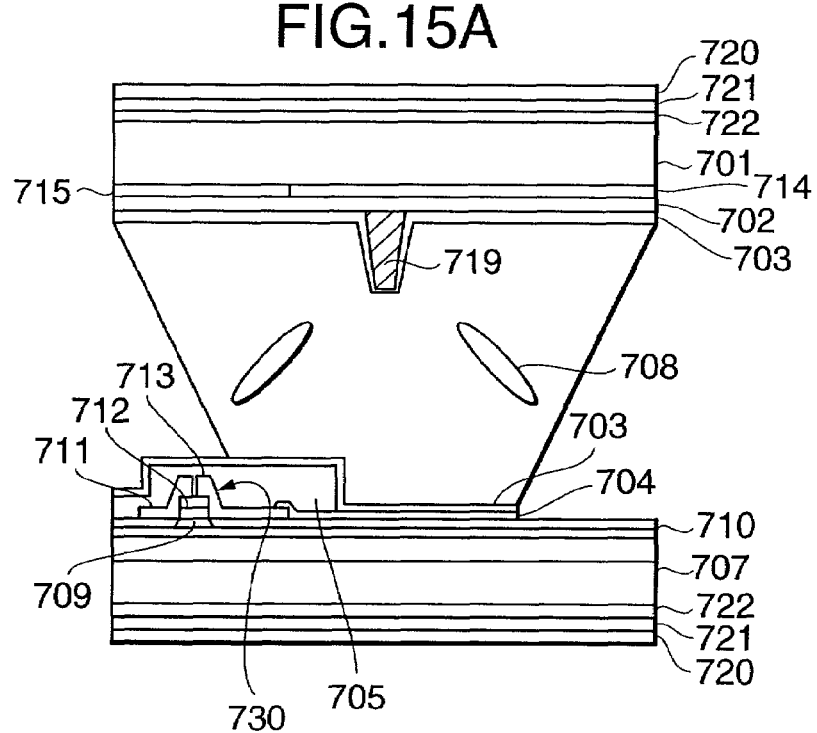
FIG. 15A is a cross-sectional view of a liquid crystal display according to a sixth embodiment of the present invention, taken on the line E-E' in FIG. 15B.
Figure 15B:
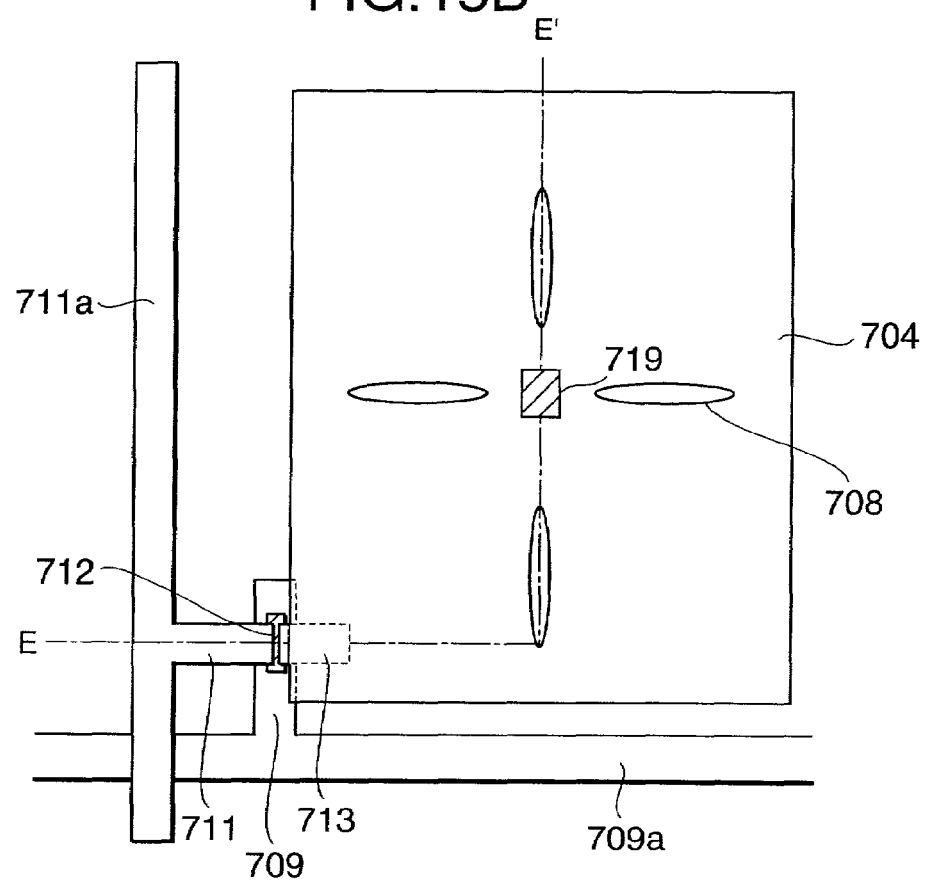
FIG. 15B is a plan view of the liquid crystal display shown in FIG. 15A.

Referring to FIGS. 15A and 15B, a liquid crystal display according to a sixth embodiment of the present invention is described. This liquid crystal display is based on the active matrix driving method as in the third embodiment. A pixel thereof is shown in cross section in FIG. 15A, taken on the line E-E' in FIG. 15B.

The liquid crystal display according to the sixth embodiment comprises a TFT as in the third embodiment. At least one protrusion (projected construction) 719 are formed on a common electrode 702 in place of the rod-shaped spacer. Other components and parts are similar to those described in conjunction with the third embodiment.

It is preferable that the protrusion 702 is of a conical shape similar to the symmetrical pixel electrode. The dielectric constant of the material of the protrusion is preferably smaller than that of the liquid crystal.

Preferably, the protrusion 702 has a height equal to or larger than 5% of the distance between the common electrode 702 and a pixel electrode 704. This facilitates generation of the multi-domain structure because the height of the protrusion 702 smaller than 5% of the distance may prevent the protrusion from serving as the boundaries of the domains.

More preferably, the protrusion 702 has a height equal to or larger than 10% to 90% of the distance between the common electrode 702 and the pixel electrode 704. The height of 10% or larger generates the domains more effectively while the height of not larger than 90% ensures a clearance not to exceed 100%.

As in the third embodiment, when a voltage is applied to a gate electrode 709 to activate the TFT, electric fields are thus generated across the pixel electrode 704 and the opposing common electrode 702. Since the pixel electrode 704 has a symmetrical shape and the common electrode 702 has larger outside dimensions than the pixel electrode 704, the direction of the electric fields between the electrodes is not at right angles to the substrate. Instead, the electric fields are tilted in a direction toward the center of the pixel. These electric fields cause the liquid crystal molecules 708 with negative dielectric anisotropy to be oriented toward the center of the pixel in a symmetrical manner. As a result, multiple domains are produced while maintaining the symmetrical formation of the molecules.

As apparent from the above, the pixel can be divided into multiple domains where the liquid crystal molecules are aligned differently from those in the other domains, without any special treatment of the alignment layer. The viewing angle can thus be increased.

The protrusion 719 located at the approximate center of the symmetrical pixel plays an essential role to make up separate domains where the liquid crystal molecules are aligned differently from those in the other domains. The advantageous effects obtained with the uniaxial negative compensation films and the quarter wave plates are similar to those obtained in the third embodiment. In particular, when the pixel electrode has a polygonal shape and the liquid crystal molecules have a large distribution in the azimuthal direction, the quarter wave plates can provide a higher luminance. The direction of the polarizing plates, that is, the direction with a wide viewing angle can be determined in any direction.

In order to avoid disturbance of the orientation due to the electric fields from the gate line (scanning signal line) 709a and the drain line (video signal electrode) 711a, the distance maybe increased between the scanning signal electrode 709a or the video signal electrode 711a and the pixel electrode 704. Another solution to the problem of the disturbance is to position a shielding electrode or a part of the pixel electrode 704 on the top surface of at least one of the scanning signal electrode 709a and the video signal electrode 711a. Depending on the design of the pixel, only insufficient distance may be provided between the scanning signal electrode 709a or the video signal electrode 711a and the pixel electrode 704 cannot be increased for the reason of the aperture ratio. In order to ensure better control of the tilting angle of the liquid crystal molecules, an optical alignment layer may be used for the alignment layer. Polarized light at oblique angles or non-polarized light may be irradiated according to the nature and characteristics of the optical alignment layer. A small amount of monomer may be contained in the liquid crystal to prevent the orientation of the liquid crystal from being disturbed. The monomer can be polymerized to retain a proper orientation.

For the purpose of stabilizing the boundaries of the domains, notches may be formed in the pixel as shown in FIG. 3. The notches may extend radially outwardly toward the periphery of each symmetrical geometry. For the polygonal pixel electrodes, the notches 104b are formed therein at each corner of the polygon. Alternatively, as shown in FIGS. 4A to 4E, the pixel electrode may have protrusions 104c extending radially outwardly from the periphery of the electrode. For the polygonal pixel electrodes, the protrusions 104c are extended from each corner of the polygon. The pixel electrode may have electrode-free areas 104d where no electrode is formed, as indicated by the broken line in FIGS. 6A to 6G. The electrode-free areas 104d extend radially outwardly from the center of the symmetrical electrode. Furthermore, the pixel electrode may have concave portions 104e, as indicated by the solid line in FIGS. 7A to 7G. The concave portions 104e extend radially outwardly from the center of the symmetrical electrode. The concave portions 104e may be formed either separately on the pixel electrode or integrally therein. A combination of the above-mentioned configurations may also be used.

When uniaxial negative compensation films 722 were placed between the polarizing plate 720 and the glass substrate 701, the phase retardation in the off state is cancelled. The black on the display is very black even if the viewer moves several inches away from directly in front of either of the screen. The visibility of the display is thus improved.

In the above-mentioned description, it is assumed that the liquid crystal molecules have negative dielectric anisotropy and are aligned at right angles to the substrate when no voltage is applied. However, similar orientation can be achieved to the one described in the second embodiment when the liquid crystal molecules have positive dielectric anisotropy and are aligned in a twisted nematic manner in the off state. The viewing angle can also be increased. In this case, the liquid crystal layer is divided into four distinct domains as shown in FIGS. 8A and 8B. With the twisted nematic liquid crystal, the pixel preferably has a square shape.

EXAMPLE 19

Example 4 was repeated to produce a TFT substrate and a color filter substrate as the opposing substrates. A pyramid-shaped protrusion whose sides are 5 micrometers long was made in place of the rod-shaped spacer. The protrusion was made of a photo-sensitive acrylic resin and had a height of 3.7 micrometers.

The protrusion was observed through SEM. As a result, it was found that the upper portion was depressed due to the effects of exposure, development, and heating but the shape was close to the pyramid shape. The spacers of 3.7 micrometers were sprayed as in Example 4 to produce a liquid crystal panel.

The optical properties of the panel thus obtained were measured. The results indicated that the panel has a high contrast ratio over a wide viewing angle with less or no gray scale inversion. There was no dark area along the transmission axis of the polarizing plate, providing a display with high luminance.

It is apparent that the present invention is not limited to the above embodiments, but may be modified and changed without departing from the scope and sprit of the invention.

What is claimed is:

1. A liquid crystal display device, comprising:
a first substrate on which a plurality of pixel electrodes are formed, said plurality of pixel electrodes comprising a symmetrical shape;
a second substrate on which an opposing electrode is formed;
a liquid crystal layer sandwiched between said first and second substrates, said second substrate further having thereon a plurality of protrusions, each of said protrusions being positioned at a central portion of a corresponding one of said pixel electrodes and elongated toward the first substrate; and
an alignment layer formed between said plurality of protrusions and said first substrate,
wherein said plurality of protrusions comprises a rod-shaped spacer extending between said first and second substrates.

2. The device as claimed in claim 1, wherein said pixel electrodes comprise notches formed on peripheral portions of said pixel electrodes.

3. The device as claimed in claim 1, wherein said pixel electrodes comprise concave portions extending radially outward from centers of said pixel electrodes.

4. The device as claimed in claim 1, wherein said rod-shaped spacer is formed in a central portion of an area of said pixel electrode.

5. The device as claimed in claim 1, wherein said protrusions extend in a direction of said first substrate from symmetrical centers of corresponding ones of said pixel electrodes.

6. The device as claimed in claim 1, wherein said rod-shaped spacer defines a plurality of domains of said liquid crystal layer for a corresponding one of said pixel electrodes.

7. The device as claimed in claim 1, wherein said first and second substrates are joined via said rod-shaped spacer.

8. The device as claimed in claim 1, wherein said rod-shaped spacer comprises a cross-sectional configuration which is similar to a cross-sectional configuration of said corresponding one of said pixel electrodes.

9. The device as claimed in claim 1, wherein a shape of a pixel electrode in said plurality of pixel electrodes is symmetrical about a corresponding protrusion in said plurality of protrusions.

10. The device as claimed in claim 1, wherein said plurality of protrusions comprise a core for dividing alignment directions of said liquid crystal layer.

11. The device as claimed in claim 1, wherein said liquid crystal layer comprises a plurality of domains having boundaries which are defined by a protrusion in said plurality of protrusions.

12. The device as claimed in claim 11, wherein said boundaries extend radially outwardly from said protrusion.

13. A liquid crystal display device, comprising:
a first substrate on which a plurality of pixel electrodes are formed;
a second substrate on which an opposing electrode is formed; and
a liquid crystal layer sandwiched between said first and second substrates, said second substrate further having thereon a plurality of protrusions, each of said protrusions being positioned at a central portion of a corresponding one of said pixel electrodes,
wherein said protrusions comprise an isotropic material and a black material.

14. A liquid crystal display device, comprising:
a first substrate on which a plurality of pixel electrodes are formed;
a second substrate on which an opposing electrode is formed;
a liquid crystal layer sandwiched between said first and second substrates, said second substrate further having thereon a plurality of protrusions, each of said protrusions being positioned at a central portion of a corresponding one of said pixel electrodes; and
a light-shielding layer formed on said protrusions, to inhibit a leakage of light through said liquid crystal layer.

15. A liquid crystal display device, comprising:
a first substrate on which a plurality of pixel electrodes are formed;
a second substrate on which an opposing electrode is formed; and
a liquid crystal layer sandwiched between said first and second substrates, said second substrate further having thereon a plurality of protrusions, each of said protrusions being positioned at a central portion of a corresponding one of said pixel electrodes,
wherein said opposing electrode comprises a plurality of stripe-shaped electrodes formed perpendicularly to said plurality of pixel electrodes, an intersection of a pixel electrode in said plurality of pixel electrodes and a stripe-shaped electrode in said plurality of stripe-shaped electrodes, defining a pixel of said liquid crystal display device.

16. The device as claimed in claim 15, wherein an electric field formed in said liquid crystal layer between said pixel electrode and a corresponding one of said opposing electrodes is tilted toward a center of said pixel.

17. The device as claimed in claim 16, wherein said electric field causes molecules of said liquid crystal layer to be symmetrically oriented toward center of said pixel.

18. A liquid crystal display device, comprising:
a first substrate on which a plurality of pixel electrodes are formed;
a second substrate on which an opposing electrode is formed; and
a liquid crystal layer sandwiched between said first and second substrates, said second substrate further having thereon a plurality of protrusions, each of said protrusions being positioned at a central portion of a corresponding one of said pixel electrodes,
wherein said plurality of protrusions comprises a rod-shaped spacer extending between said first and second substrates,
wherein said rod-shaped spacer defines a plurality of domains of said liquid crystal layer for a corresponding one of said pixel electrodes, and
wherein said plurality of domains comprises a plurality of symmetrical liquid crystal domains.

19. A liquid crystal display device, comprising:
a first substrate on which a plurality of pixel electrodes are formed;
a second substrate on which an opposing electrode is formed; and
a liquid crystal layer sandwiched between said first and second substrates, said second substrate further having thereon a plurality of protrusions, each of said protrusions being positioned at a central portion of a corresponding one of said pixel electrodes,
wherein said plurality of protrusions comprises a rod-shaped spacer extending between said first and second substrates,
wherein said rod-shaped spacer defines a plurality of domains of said liquid crystal layer for a corresponding one of said pixel electrodes, and
wherein a liquid crystal material in said liquid crystal layer is alignable differently in one of said plurality of domains than in another one of said plurality of domains.

* * * * *